United States Patent
Saelens

(10) Patent No.: US 7,024,285 B2
(45) Date of Patent: Apr. 4, 2006

(54) OBJECT-ORIENTED OPERATING SYSTEM FOR A SPRAY CONTROLLER

(75) Inventor: Hans Saelens, Evergem (BE)

(73) Assignee: Spraying Systems Co., Wheaton, IL (US)

( * ) Notice: Subject to any disclaimer, the term of this patent is extended or adjusted under 35 U.S.C. 154(b) by 178 days.

(21) Appl. No.: 10/463,164

(22) Filed: Jun. 17, 2003

(65) Prior Publication Data

US 2004/0260429 A1    Dec. 23, 2004

(51) Int. Cl.
*G05D 7/00* (2006.01)
*G05B 11/01* (2006.01)

(52) U.S. Cl. .................... 700/283; 700/19; 239/69
(58) Field of Classification Search ............... 700/19, 700/283, 284; 239/69; 712/40, 233
See application file for complete search history.

(56) References Cited

U.S. PATENT DOCUMENTS

| | | | |
|---|---|---|---|
| 4,885,717 A * | 12/1989 | Beck et al. ............... 717/125 |
| 5,576,946 A | 11/1996 | Bender et al. .............. 700/17 |
| 5,591,409 A | 1/1997 | Watkins ..................... 422/110 |
| 5,903,894 A * | 5/1999 | Reneris ..................... 707/100 |
| 5,927,603 A | 7/1999 | McNabb ...................... 239/63 |
| 6,104,963 A * | 8/2000 | Cebasek et al. ............. 700/86 |
| 6,115,646 A * | 9/2000 | Fiszman et al. ............ 700/181 |
| 6,141,595 A * | 10/2000 | Gloudeman et al. ......... 700/83 |
| 6,199,000 B1 | 3/2001 | Keller et al. ................ 701/50 |
| 6,282,458 B1 | 8/2001 | Murayama et al. ......... 700/239 |
| 6,345,212 B1 | 2/2002 | Nourse ...................... 700/182 |
| 6,371,451 B1 | 4/2002 | Choi ........................... 261/26 |
| 6,445,969 B1 | 9/2002 | Kenney et al. ............ 700/108 |
| 6,460,070 B1 | 10/2002 | Turek et al. ............... 709/202 |
| 2001/0056306 A1* | 12/2001 | Nakai et al. ................. 700/86 |
| 2003/0100968 A1* | 5/2003 | Gagner ........................ 700/96 |

* cited by examiner

*Primary Examiner*—Paul Rodriguez
(74) *Attorney, Agent, or Firm*—Leydig, Voit & Mayer, Ltd.

(57) ABSTRACT

A method and system for implementing a spray controller uses object-orientated software code and an interrupt-driven operating system for processing and interpreting the code.

13 Claims, 17 Drawing Sheets

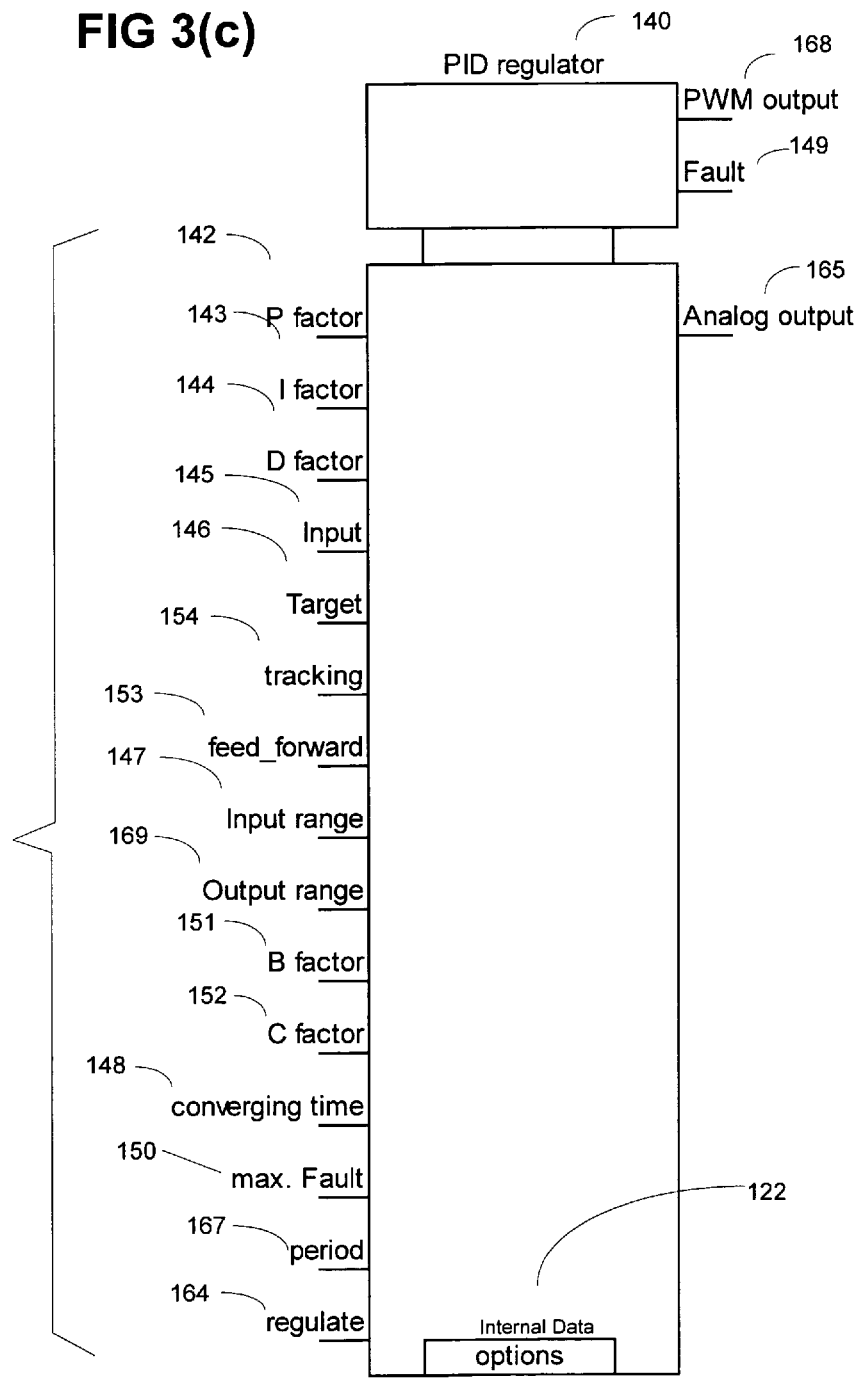

OBJECT-ORIENTED OPERATING SYSTEM FOR A SPRAY CONTROLLER

FIELD OF THE INVENTION

This invention relates generally to spray control systems, and more particularly, to an operating system and environment for controlling a spraying system implemented using object-oriented programming techniques.

BACKGROUND OF THE INVENTION

Spray control systems are used in variety of applications, such as for applying paints and other coating compositions to plastic, metal, and optical components. In many of these applications, it is beneficial if not important to achieve a uniform thickness of coating material. Consequently, spray control systems typically utilize closed loop control to regulate the flow of coating fluid and/or fluid pressure provided to the spray gun or other applicator. These closed loop control schemes use the error between the measured flow and/or pressure and setpoints corresponding to desired flow and pressure to provide negative feedback that drives the flow toward the setpoint. PID (proportional plus integral plus derivative) control is common among these control schemes.

In other applications, such control systems may be employed in agricultural environments to regulate the application of liquids and chemicals such as water or fertilizer, to crops, plants and soil. In these applications, the spraying control system allows users to easily measure and monitor desired plant or crop characteristics such as temperature or soil density, control and modify the flow rate and pressure of the liquid or chemical being distributed, and adjust spray settings according to differing levels of plant/crop growth and activity. The capabilities afforded by such systems promote increased plant/crop production and better efficiency.

In these applications, the spray controller performs numerous logical operations based on the receipt of input information to provide overall monitoring and control of operating parameters of the system. For example, in the case of a mobile spraying system, the controller may receive various signals from input devices, such as sensors that detect system pressure, flow rate, spray application rate, and/or ground speed. Other input components may include a user keypad for entering desired setpoints, functional switches for altering application modes/settings or a barcode reader for receiving user input commands and instructions. In response to the input information, the spray controller operates in a logical fashion to provide output signals to various output components, such as flow valve actuators and the like.

The input and output components and devices interact with one another to perform the various functions of the controller under the control of a central processing unit (CPU). The CPU is capable of processing the logical instructions and/or algorithms that regulate how the components interact, and controls the overall operation of the spray system. These instructions and algorithms are stored in a programmable memory device resident within the controller circuitry or within the CPU memory directly. Commonly, the instructions/algorithms are designed using relay ladder logic and other conventional programmable logic languages.

In these known systems, the user has limited ability to modify the control and operation of the controller according to the specific requirements of his or her application. That is, while the user can alter the desired setpoints for the control system, the more intrinsic logical and procedural operations as defined by the instructions/algorithms within the controller memory cannot be directly modified. The ability of the user to accommodate spraying requirements that extend beyond the capabilities of the pre-programmed user settings/modes is impractical in most conventional spray controllers and systems.

Although the controller program code can be modified or customized for the user by the system manufacturer to meet a specific set of requirements, this level of customization can be costly to the user, especially when only small quantities of customized controllers are needed. Furthermore, users already having existing spray controllers that call for only simple modifications must either incur the expense of reprogramming the controller, or replace their existing controllers with a different one. These options are inconvenient and costly.

SUMMARY OF THE INVENTION

The present invention overcomes the limitations of the prior art by providing a spray controller that may be readily modeled, modified and/or reprogrammed, depending on the needs of the user. In this way, the user can alter the logical operation of the spray controller, as well as modify the interaction between the various components of the controller to meet specific application requirements. The invention also relates to a method and system for implementing the physical and logical properties of the spray controller using object-oriented software code, and an interrupt-driven operating system having instructions for processing and interpreting the code to control the various operating parameters of the spraying system.

Specifically, a plurality of software objects are accessible from a function block software library residing within the program memory of a computer by a configuration program/application that executes on the computer. The software objects are implemented as data structures representative of the various physical and logical properties of the spray controller. The configuration program operates to interconnect the plurality of objects to create a desired functional block representation of the spray controller. Once the functional block representation is created, an application file is generated. In one embodiment, the application file is a binary representation of the functional block diagram, and is transferred from the computer to the controller via a remote transfer or other suitable communication channel. The application file is then loaded into the controller memory.

During execution of the controller, a runtime software engine interprets and processes the application file. The runtime engine is an interrupt-driven operating system and environment that executes within the controller. Function block code containing specific instructions for implementing the functionality of the plurality of data structures/software objects is also stored within the controller memory. For each data structure specified in the application file, the runtime engine executes a corresponding set of function block code to perform the specified logical or physical operation of the controller. The runtime engine also facilitates the exchange of commands or data between the various data structures according to uniquely assigned data references and logical address locations. This allows the various data structures and consequently, the various components of the controller, to interact with one another accordingly. In accordance with one feature of the invention, the runtime engine is capable of handling interrupts generated in response to a stimulus detected by a physical component of the spray controller. This allows the controller to experience increased response times to external events.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 3(a) through 3(d) illustrate exemplary software objects to be used for implementing the functionality of the spray controller of FIG. 1;

DETAILED DESCRIPTION OF THE PREFERRED EMBODIMENTS

The present invention generally relates to a method and system for implementing the logical and physical operations of an electronic spray controller using object-oriented programming techniques. In this way, the invention provides a convenient way to implement the functionality of an industrial spray controller without knowledge of the underlying complexities of each logical and physical property of the system.

The invention also relates to an interrupt-driven operating system and environment for controlling the various features and mechanisms of the spray controller. As described herein, an electronic spray controller generally relates to a system for controlling and automating the application of fluid in any industrial or agricultural application. Thus, for example, the invention may be used in a control system for applying chemicals and other material resources to plants, crops, shrubbery, foliage, pathways, etc. Those skilled in the art should understand that the invention also extends to other types of spray control systems, such as those used in various other industrial applications such as in the application of paint or other fluids such as resinous compositions and the like.

As described herein, the term "object-oriented programming" (OOP) generally refers to a type of programming that views programs as performing operations on a set of objects. The operations are performed with the use of message passing back and forth between independent objects. In general, the objects themselves correspond to entities, either conceptual or physical, of interest in the spraying system. The concept of an object combines the attributes of procedures and data such that there is a collection of some private data and a set of operations that can access that data. Objects store data in variables and respond to messages by executing procedures or methods.

Accordingly, an object will generally refer to a self-contained software entity that includes both data and procedures to manipulate the data. The properties of an object are defined according to a unique object class, or hierarchy of classes, created by a computer programmer. The class also defines the various interfaces such that, when an object is instantiated, allow the object to exchange data with other objects. The process by which objects may be accessed without knowledge of the internal data and mechanisms of the object is known as data encapsulation. In this way, objects can communicate with other objects according to the methods of that object's interface.

Figure 1:
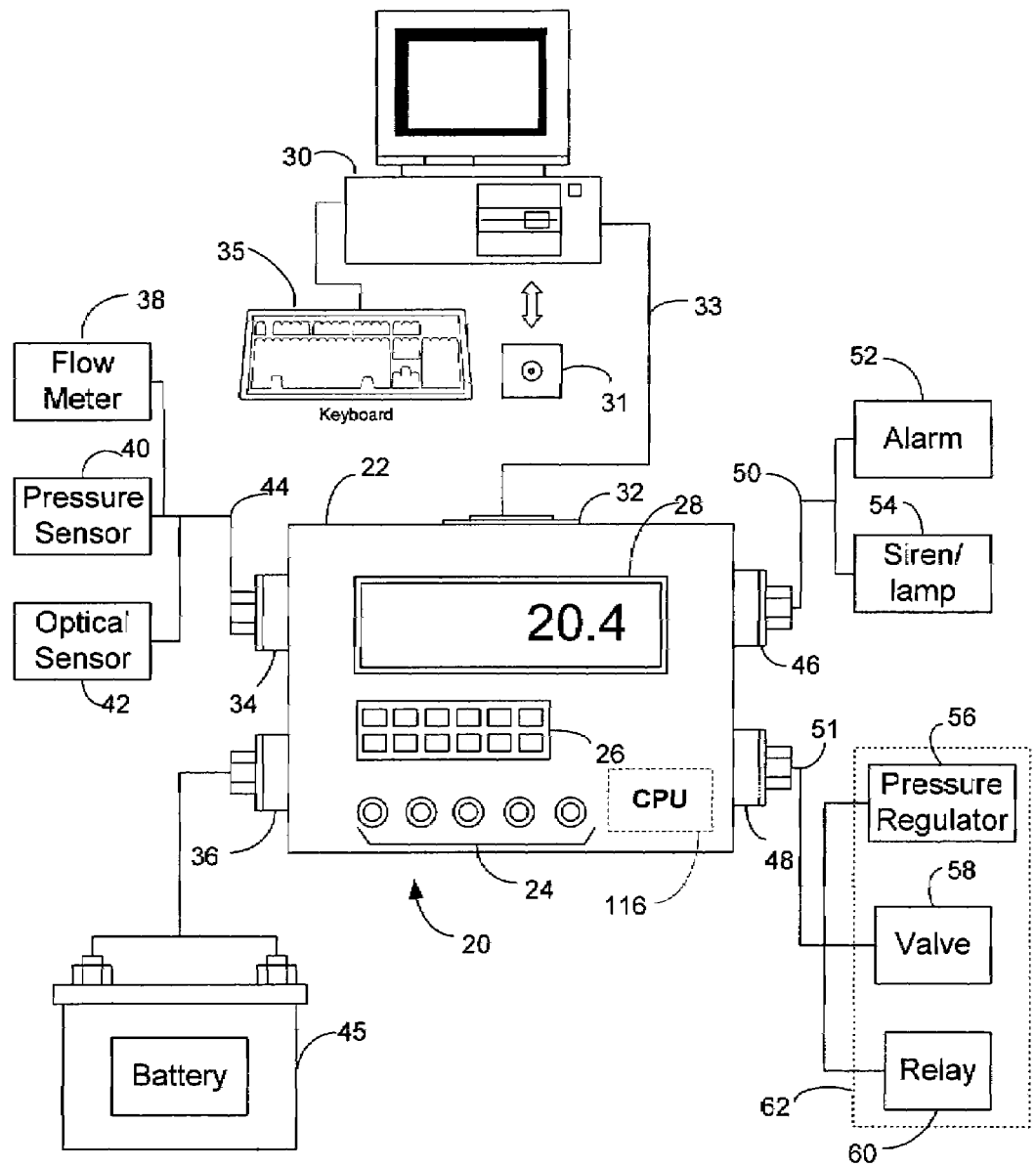
FIG. 1 is a block diagram generally illustrating an exemplary spray controller used in an agricultural application.

An exemplary spray controller 20, as shown in FIG. 1, includes a plurality of physical and logical properties for implementing its primary tasks and procedures (e.g., via hardware or firmware logic). In accordance with the present invention, a plurality of software objects are configured to represent at least certain of the physical and logical properties. These software objects are stored in a function block library that resides within an accessible storage medium maintained by a computer 30 (e.g. core memory, hard disk, etc.). The one or more software objects, referred to also as function blocks, are preferably retrieved from the function block library using a GUI based software application and then logically interconnected to yield a functional block representation of the spray controller 20. An application file is then generated from the block representation that can be transferred via a communication channel 33 to the internal controller memory.

Generally, a spray control system 20 includes a user interface panel 22 for supplying input data and providing various operation parameters. The panel 22 includes a plurality of input control switches 24 such as for regulating material application modes/settings, a keypad 26 for user data entry (input), and a digital (LCD) display 28 for conveying information to the user (output). The controller 20 also has a connector port 32, such as a serial, parallel or infrared port for allowing the data to be exchanged between the controller 20 and an external computing device such as a personal computer (PC) 30. The connector port 32 provides a general data transfer interface, which allows application data, system logs, and other information related to the spraying system to be easily retrieved from the controller memory (not shown) by the PC 30 over a communication channel 33. The data transfer interface 32 also allows program data containing executable instructions related to the operation of the controller to be downloaded from the PC 30 over the channel 33, and stored within the controller memory.

The spray controller 20 also comprises multiple input connectors 34 and 36 for communicating with external devices. Such devices may include a flow meter 38 for measuring the flow rates of low and high viscosity liquids, a pressure sensor 40 for detecting liquid pressure, and an optical sensor 42 for monitoring the spray density. Each of the devices can be connected to the spray controller using a connector cable 44, as shown in FIG. 1. Also, an external power supply or battery source 45 can be connected to the controller to provide auxiliary or primary power to the controller 20 as it is in operation.

Similarly, output devices are connected to the controller via output connectors 46, and connector cable 50 and 51 to control and regulate liquid outputs. External output devices can include an alarm 52 or indicator siren/lamp 54, a pressure regulator 56, and a plurality of valves 58 and relays 60 that operate a spray gun 62. Overall, the various input and output devices of the spray controller 20 interact with each other according to a set of programmed instructions that are stored within the controller memory. These instructions are processed by a central processing unit (CPU) located within the controller circuitry that implements the instructions to control the operation of the spray system.

Those having skill in the art will recognize that the exemplary control system of FIG. 1 can be designed to exhibit various operation characteristics. For purposes of illustration, however, the overall control system operation is as follows. The user selects setpoints representing a desired flow rate and/or pressure for the fluid to be applied. Upon activation of the spray gun, liquid supplied from a vessel (not shown) is forced through a nozzle (not shown) of the spray gun due to pressurization of the liquid. The flow rate of the liquid may be controlled by a flow control valve and is measured using the flow meter 38. The measured flow rate, as well as the detected pressure, are provided as feedback to the controller 20 and are compared to the selected setpoints. The control valve is then adjusted until the measured flow rate and pressure are equal to the setpoints. Thereafter, these data are used to provide closed loop regulation of flow rate about the selected setpoint once the spray gun is actuated and flow is detected.

In accordance with the present invention, OOP techniques are used to generate computer executable code for implementing the logical and physical operations of the spray controller. This code is interpreted and processed by an interrupt-driven operating system.

In particular, the programmatic instructions that are read from memory 118 and processed by the CPU 116 to manage the operation of the controller 20 are implemented with object-oriented software code. That is, the various logical and arithmetic operations of the controller 20, and also the characteristics of the physical components of the controller, are defined according to a plurality of software objects. In one embodiment, these objects fall into three main categories, namely input objects, function objects, and output objects. Each object is a software representation corresponding to a physical input component (e.g. a tachometer, a flow meter, a proximity sensor, etc.), a function or algorithm (e.g. add, subtract, alarm function, PID regulation), or a physical output component (e.g., a nozzle, a pressure regulator, an LCD-display).

Figure 2:
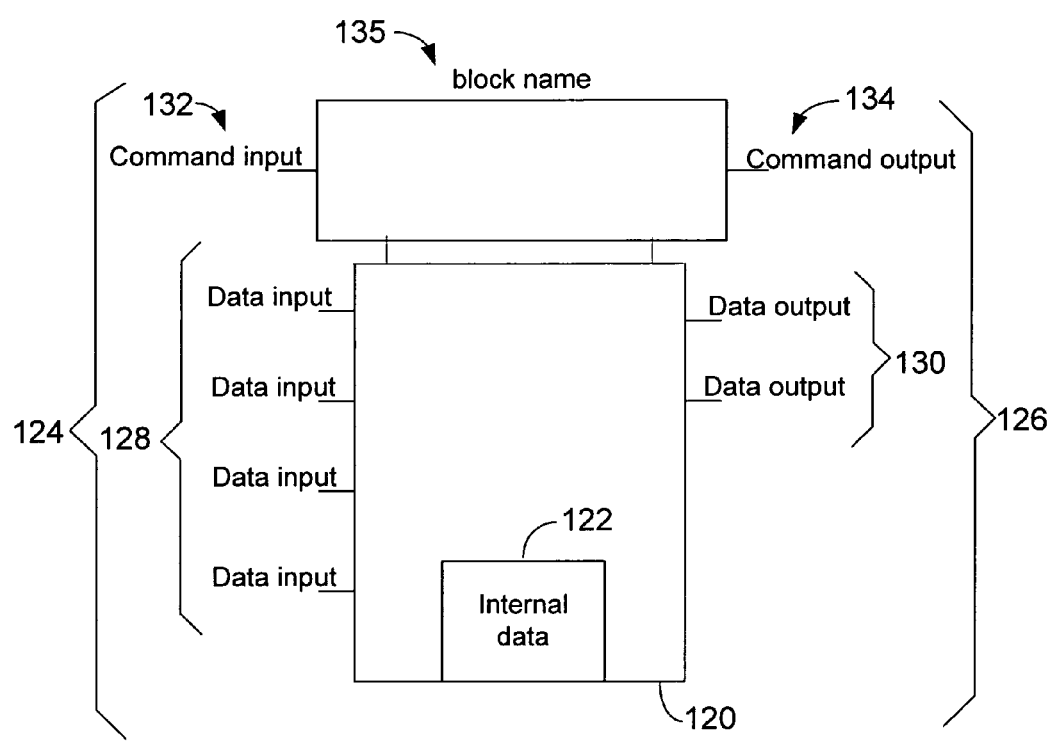
FIG. 2 is a diagram illustrating a generalized representation of a function block for implementing the spray controller of FIG. 1.

FIG. 2 shows an abstraction of a function block object or software object 120 that is used to build an application program according to the invention. A software object 120 is a graphical representation of a function block—a specialized control feature stored within memory of the controller—that corresponds to a specific property of the controller. More specifically, each software object is implemented as a data structure representative of a specific logical or physical component of the controller. The data structure 120 comprises different types of data that define its characteristics. This includes internal data 122, which is data that is supplied by the user of the controller system 20 or the system manufacturer at design time. The internal data of an object is static, and therefore cannot typically be changed during the processing or execution of the data structure 120. Internal data 122 can include properties specific to the particular hardware component or function represented by the software object 120.

By way of example, internal data may include the physical address of an output component (e.g., a flow meter), or a maximum/minimum value of an input or output parameter for a hardware component. Internal data may also include component or application specific instructions and algorithms that are necessary for the proper operation of the controller. For instance, a scaling function, linearization factor or power regulation function may be stored within the internal data 122 to regulate or control the behavior of an actuator. Virtually any data, including algorithms, complex instruction sets, data tables, logical address locations, etc., can be stored as internal data 122 that is associated with a particular software object.

The data structure 120 also comprises one or more input 124 and output 126 lines. These lines are the primary external interface points of the function block 120 for receiving and/or transmitting data and commands. The data lines 128 receive the data necessary for the object's internal operation, and the data outputs 130 yield the output produced by the object as a result of its execution. Likewise, command inputs 132 and command outputs 134 allow commands to be received and events to be triggered by a software object, respectively. The lines 124 and 126 permit commands and data to be stored into, and subsequently retrieved from, the data structure 120.

As illustrated in FIG. 2, the internal data 122 varies significantly from the input data 124. The internal data 122, unlike the input data 124, cannot typically be altered. Rather, the internal data includes information that is specific to the operation of the controller, and thus cannot be changed. The input data, on the other hand, represents data that can be received in various ways, such as from one or more databases that are accessible by the computer 30, or as a result of direct user input via a keyboard 35. As such, the input data 124 may be readily modified or altered to affect the corresponding output 126. Thus, each function block object 120, provides a well defined interface for accessing the control features of the controller, while maintaining hidden internal data and algorithms; effectively eliminating the complexity associated with designing a control program for the controller. This aspect of the invention will be discussed in greater detail in later sections of the detailed description. In the following paragraphs, the various software objects or function block objects to be utilized for implementing/programming the physical and logical properties of the controller will be discussed.

Numerous logical functions and physical components may be used to characterize an industrial spray system, including spray nozzles, valves, and timing functions. One example of a commonly used component of an industrial spray system is a Proportional-Integral-Derivative (PID) regulator. PID regulators are used widely within feedback systems for various applications to provide an enhanced level of automated control. In both synchronous and asynchronous control systems, smooth operation, exact precision and relative stability of the system are desired control characteristics. This is especially true in spray control systems, where precision application of material resources to a designated target is desired. To accommodate this level of control, PID regulators include a proportional control factor P, which allows for constant gain control of the system at varying frequencies. Also included is integral control I for improving steady state performance, and derivative control D for enhancing the transient properties of the system. A PID regulator is simply a physical component that operates according to the mathematical control function shown below:

$$D(s)=K*[1+1/T_I s+T_D s]$$

D(s)=characteristic transfer function of PID controller
K=gain constant
$T_I$=integral or reset time
$T_D$=derivative time To define the behavior of the PID regulator, the engineer need merely adjust the constants K, $T_I$, and $T_D$ to arrive at acceptable performance.

While PID control is of particular interest to the industrial control systems industry, traditional control system programming languages, such as relay ladder logic (RLL), do not offer an easy way to provide PID control. In fact, other more complex repetitive mathematical control functions, such as for time or amplitude scaling, lead or lag compensation, Smith tuning, and/or Ziegler-Nichols functions, are also not easily programmed using conventional languages. Programming a controller using RLL for instance would require the designer to force fit these functions into the ladder design. While an experienced RLL programmer can certainly accomplish this, the time and energy expended would decrease design productivity. In accordance with the invention however, such intricate functions are easily implemented as a plurality of software objects. For example, a software abstraction for a PID regulator 140 is shown in FIGS. 3(*a*) and 3(*c*).

The generally simplified PID regulator function block controls the process with an analog output signal (analog output) or with a digital pulse width modulated signal (PWM output). For performing this function, the PID function block scales a received input value (such as a process output) and a target value (a process setpoint) using an input scaling range. The output is scaled in accordance with an output range.

The PID function block also performs various fault operation and detection functions. For example, in one embodiment, a fault signal is generated when the process output does not converge to the setpoint within a preset convergence time. As shown generally in FIG. 3(*c*), this block may also perform advanced PID features such as proportional (B factor) and differential (C factor) setpoint weighting, feed forward and tracking. In addition, for flow control, this block may receive inhibit input (regulate) to hold the output control signal at a certain value. This prevents the pressure (analog output) from increasing if the spray gun is not spraying. In this example, a flow sensor is used as a process input. In addition, the PID block may operate using a configured period time base.

The PID regulator function block object 140 (data structure) comprises multiple input terminals for receiving data, including the proportional (P) 142, integral (I) 143 and derivative (D) 144 control factors for regulating flow control. Other inputs include the reference input value 145, the target (desired) value 146 that the input is to be regulated to, the input value range 140, and a converge time input 148. The converge time results in a fault signal 149 being generated in the event that the process output does not converge to a designated setpoint with the specified (con-verge) time. As another added feature, the fault signal can be set to a specified maximum value 150 to vary the level of sensitivity. More advanced PID features, such as a proportional (B factor) 151 and differential (C factor) 152 setpoint weighting, feed forward 153 and tracking 154, are conveniently provided as well.

Especially for flow control, the PID has an inhibit input (regulate) 164 that can be used to temporarily hold the control signal to a certain level. This can prevent the pressure, or analog output 165, from rising in instances where the PID is used to regulate an inactive but connected output device, such as a spray gun (e.g. by manipulating the analog output range 169). A defined period setting 167 is also provided, which allows the regulator to operate using a configured period as a time base. The PID regulator object also comprises a PWM (pulse width modulated) output 168 to allow for digital signal control. Also, the PID regulator includes internal data 122 including the logical address information of the output value or any special control options.

By design, the PID regulator object 140 provides a convenient programming interface for implementing the PID mathematical function shown above (e.g. for altering the K, $T_I$, and $T_D$ values). In this way, the intricacies of the function itself are hidden from the user, which minimizes the time and skill required to implement PID regulation within the controller 20. The implementation of the PID regulator described in FIG. 3(*a*) is only one possible implementation. Indeed, the PID regulator object, and all of the software objects representative of the various aspects of the controller, can be designed to meet specific applications.

FIGS. 3(*b*) and 3(*d*) illustrate another software object 172 corresponding to a commonly used component within a spray controller 20, namely, an abstraction of a spray gun 62 or a plurality of spray guns such as those arranged in parallel relation. The spray gun 62 serves as the primary mechanism that allows material resources, such as water, paint or fertilizer, to be applied to an intended target (e.g., surface to be painted). Typically, a spray gun includes a plurality of nozzles, valves and pressure regulators, which interact to provide precision spraying capability. The purpose of the spray gun function block is to perform timing control operations of various outputs that drive the spray gun (or several guns in parallel). For performing this function, typically the following actuators are controlled: (1) open-close control of the gun to start or stop spraying such as through a cylinder output or, in the case of electrical operated guns, a PWM signal with fast on-off control may be used to change the liquid flow rate applied by the gun via the PWM bridge output; (2) open-close control for atomizing air such as via an anticipator or follower output; and (3) open-close control for fan air such as through a second anticipator follower output. In accordance with the invention, the spray gun function block handles various timing relating to these outputs. The spray gun block itself contains the hardware specification for the PWM bridge output as an example. Other digital outputs may be connected to the spray gun block when necessary in that, in the preferred embodiment, the spray gun block includes a dedicated command output or outputs for this purpose. Based on a target flow rate and maximum target flow rate input parameters, the spray gun function block calculates the necessary PWM duty cycle.

Figure 3A:
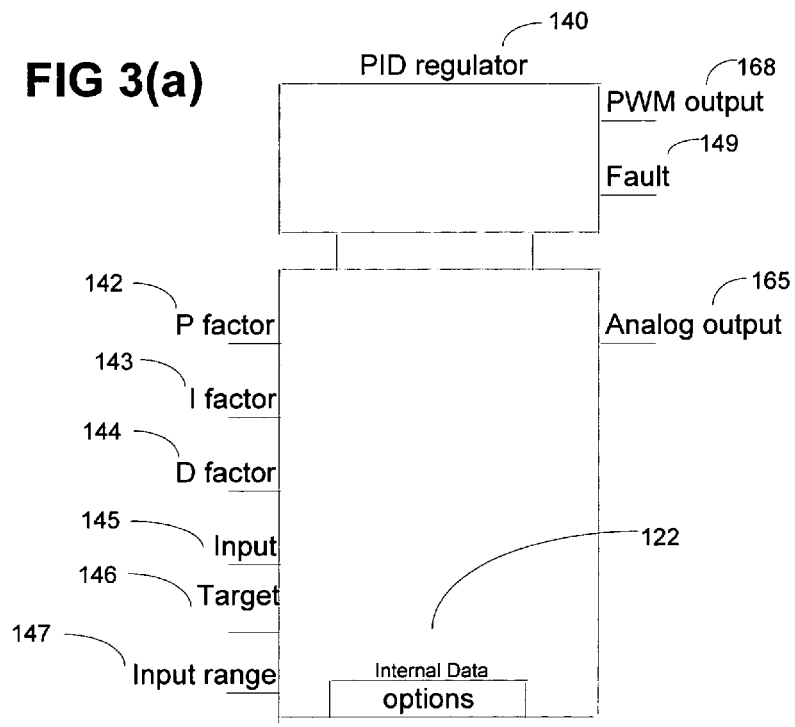

In summary, the spray gun function block performs the functions of on-off switching of the spray gun based on timing information. In particular, the spray gun function block starts and stops spraying of the gun based on various commands received in the command control input, as shown in FIG. 3(a). The timing is related to the moment of receiving start or stop commands. When a delayed spray command is received, an internal timer may be used to create a delay.

In addition to switching based on timing information, the spray gun function block may perform on-off switching of the spray gun based on distance information. In this instance, the spray gun function block starts and stops the spraying of the gun based on the commands received in the command control input. The timing in this instance is related to the moment of receiving the start or stop command. When a delayed spraying command is received, then a tack-based timer is initiated to create a distance delay. A frequency input (TACHY) is used as a timing reference. In this case, timing is expressed in a number of pulses from the frequency input rather than a number of milliseconds. The spray gun function block performs duty cycle handling of the pulse width modulated (PWM) gun output. To do this, the spray gun function block uses a target flow rate, a maximum flow rate, a minimum duty cycle, a maximum duty cycle, and frequency inputs to calculate the desired duty cycle and frequency to drive the PWM output to the gun.

The spray gun control block performs anticipator follower on-off timing for atomizing in fan air outputs. That is, the spray gun function block uses the anticipator delay parameter $T_a$ and follower delay $T_f$ inputs to drive two or more anticipator follower outputs with correct timing information. In other words, the outputs are switched on before the actual gun is switched on (with the delay $T_a$) and the outputs are switched off after the gun is switched off (with the delay $T_f$).

The spray gun function block also performs hardware fault checking such as hardware bridge faults, on-off feedback faults, and the like. To perform these functions, the spray gun block checks possible hardware faults in PWM driver circuitry for short circuit or overload conditions, or the like, in the system, as would be understood by those skilled in the art. The spray gun block generates a command that may be used to trigger a screen fault message. There are also on-off feedback faults that may be detected. A switch fault is checked by the spray gun using a switch input and switch time, as shown in FIG. 3(d). This input is active when the spray gun is actually spraying within a time tolerance given by the parameter "switch time." The switch input may be connected through flow detection sensors which may detect the presence of flow through the spray gun. A valve gun open fault may be checked by the spray gun function block using a "valve gun open input" and "valve gun open time." These inputs normally follow the PWM signal at the spray gun within a time tolerance given by the input value "valve gun open time."

Figure 3B:
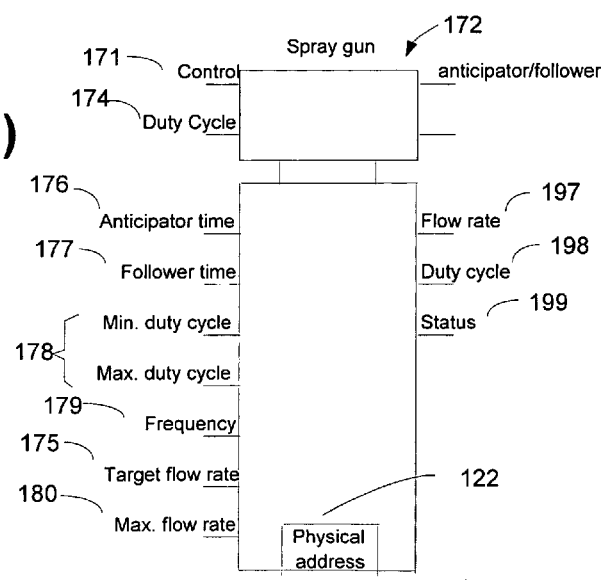
Figure 3D:
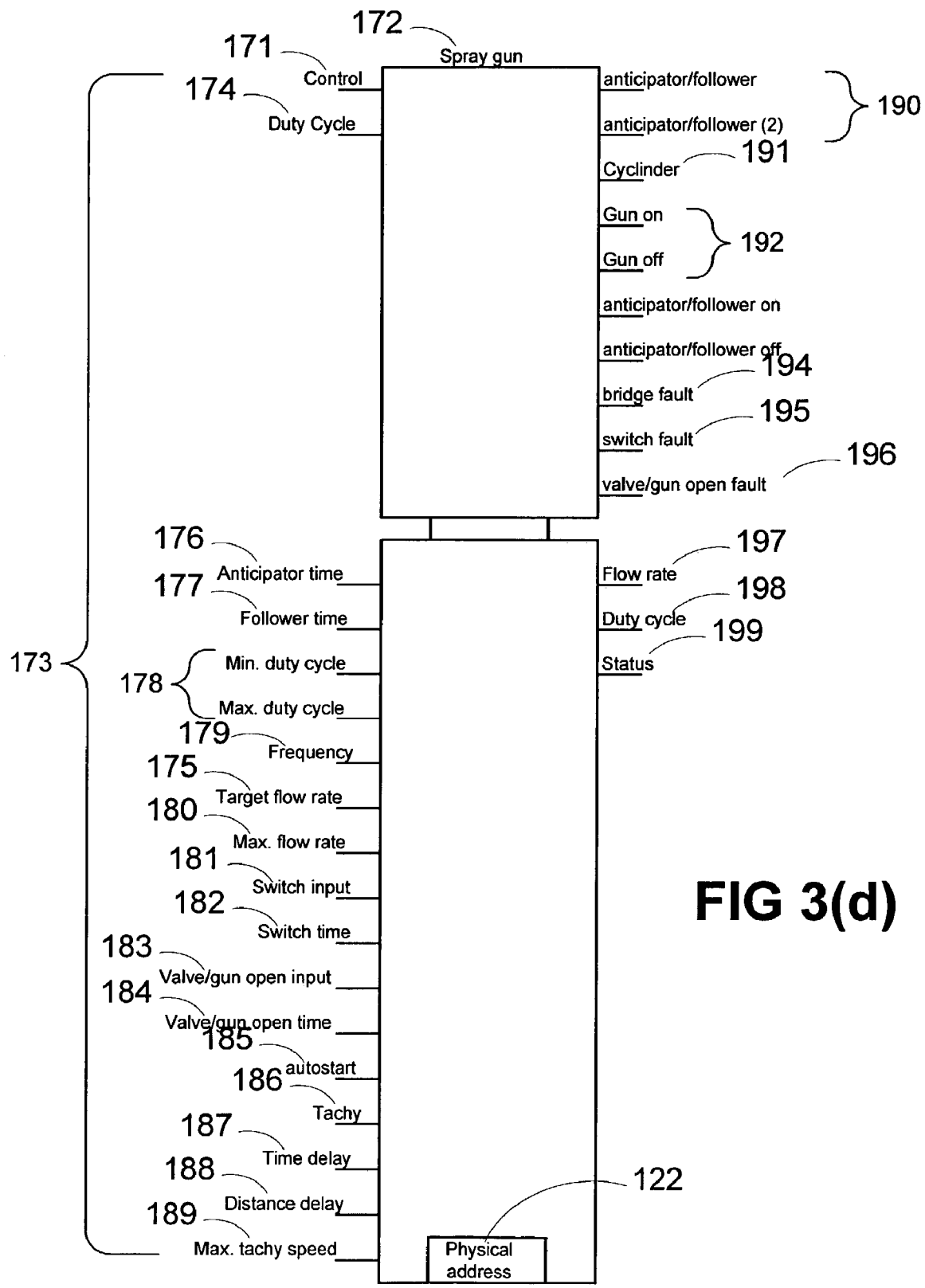

For actually implementing the spray gun function block shown in FIG. 3(b), that block may be cascaded with a multi-dimensional table function block. This block may perform various calculations to determine a maximum flow rate for a spray nozzle based on a measured liquid in atomizing air pressure. To perform this function, the multi-dimensional table function block contains a multi-dimensional table and performs an interpolation method in accordance with certain algorithms. By way of example, the interpolation algorithm may be one of the following known algorithms: (1) linear interpolation; (2) "take lower value" methodology; (3) "take higher value" methodology; (4) quadratic interpolation; (5) inverse quadratic interpolation; (6) "polynome through points in the table" interpolation; and (7) "quadratic polynome through three points" interpolation. In the preferred embodiment, different interpolation methods may be used when different dimensions of a performance data table are required. Thus, for example, a linear interpolation may be used for air pressure variations and a quadratic interpolation may be used for liquid pressure variations in certain instances. Table I below illustrates a typical example for the performance data concerning a spray nozzle which is accessed by the multi-dimensional table function block.

In one example, the liquid capacity (in liters per hour) is dependent on liquid pressure and atomizing air pressure. The multi-dimensional table block permits incomplete table values (e.g., 3 points at 0.7 bar liquid pressure exist, while 7 points exist for 1.5 liquid pressure). As noted, the multi-dimensional table is used to calculate the maximum flow rate of a spray nozzle based on the measured liquid and atomizing air pressure. The spray gun object then uses this maximum flow rate value together with the flow rate setpoint value to set a duty cycle output for the gun. The actual applied flow rate is available on the spray gun function block and can be shown on a display.

Another important use of the multi-dimensional table may be to check the performance of a nozzle. In the above example, the flow rate may be calculated based on measured liquid in air pressure. If a flow sensor in the system is then used to calculate actual flow rate, then the calculated flow rate may be compared with the measured flow rate, and when the difference exceeds a certain value, an indication is made.

As shown in FIG. 3(d), the spray gun object or block 172 includes a plurality of input terminals 173 including a control input 171, anticipator time 176, and follower time 177. The anticipator time and follower time, as well as the time delay 187 and autostart 185 inputs allow data relevant to timing control to be stored into the data structure. Timing can also be set according to an external time base via the tachometer input 186, distance delay input 188 and max tachometer speed 189 inputs. These various timing inputs influence the two anticipator/follower outputs 190, the cylinder output 191 and optionally, a pulse width modulated (PWM) output that corresponds to a designated physical address. Also included are inputs necessary for controlling the power usage of the spray gun. For instance, the duty cycle can be controlled manually via the duty cycle input 174 and the duty cycle 178 range, or automatically using the target 175 and max flow rate 180 data at a specified frequency 179.

Other output parameters for the spray gun object 172 include the gun on/off outputs 192. flow rate 197, duty cycle 198 and status output 199 for indicating the activity or condition of the spray controller. Also, three different systems for detecting faults within the spray process are provided. These are the bridge fault 194, switch fault 195 and valve/gun open fault 196.

The fault system outputs operate according to the certain logical conditions. For example, if the hardware detects a short-circuit on the pulse width modulated outputs (e.g., corresponding to the PWM output located at the physical address or for a connected pressure regulator), then a bridge fault 194 is generated. The system may also utilize the switch input 181 and the switch time data input 182 to generate a fault on the switch fault output. This may occur when the switch input fails to follow the timing and the pulse width generated signal within the set switch time 182, then the fault 195 is generated. The system also generates a valve/gun open fault output 196 when the valve/gun open input 183 and the valve/gun open time data input 184 are indicative of certain conditions. Such a fault 196 may be generated when the valve/gun open input 183 does not follow the timing within the set valve/gun open time 184.

In accordance with the invention, the logical conditions described above are not necessarily programmed directly by the spray controller designer, as required by more conventional control system programming languages. The logical conditions themselves can be hidden from the user to ease the task of programming the controller. The internal data 122, which includes the physical address information and any other special control options, can be set to account for these logical scenarios. By having a single spray gun object 172, the user is able to quickly program the desired applicator characteristics for the controller without having to assemble multiple lines of code, or a plurality of various nozzles, pressure regulators and the like. The user need only enter the applicable input data into the data structure.

The PID regulator object 140, shown in FIG. 3(*a*), and the spray gun object 172 shown in 3(*b*), are two examples of objects used to implement the spray controller 20. Of course, numerous other types of software objects may be used to model the spray controller 20. This can include, but is not limited to, a parameter object, digital and analog input/output objects, frequency inputs, tables, timing functions, menu line functions, switches, and other functional and physical components. In particular, there are as many software objects as there are physical and logical properties of the spraying system. Those skilled in the art will recognize also that various implementations of the software objects can be abstracted, and that none of the objects illustrated above are meant to be limiting as to the scope of the invention. Because the objects are implemented as data structures, they can be easily modified to accommodate varying application or user specific needs.

The invention has thus far been described with respect to the plurality of software objects that graphically and programmatically represent the logical and physical properties of the system. In order to characterize the system using these objects, an object-oriented software program is used to interconnect the pluralities of software objects in accordance with the intended or desired functionality of the controller. The objects are then executed in accordance with this characterization by the controller. This aspect of the invention is described further in the subsequent paragraphs.

Figure 4:
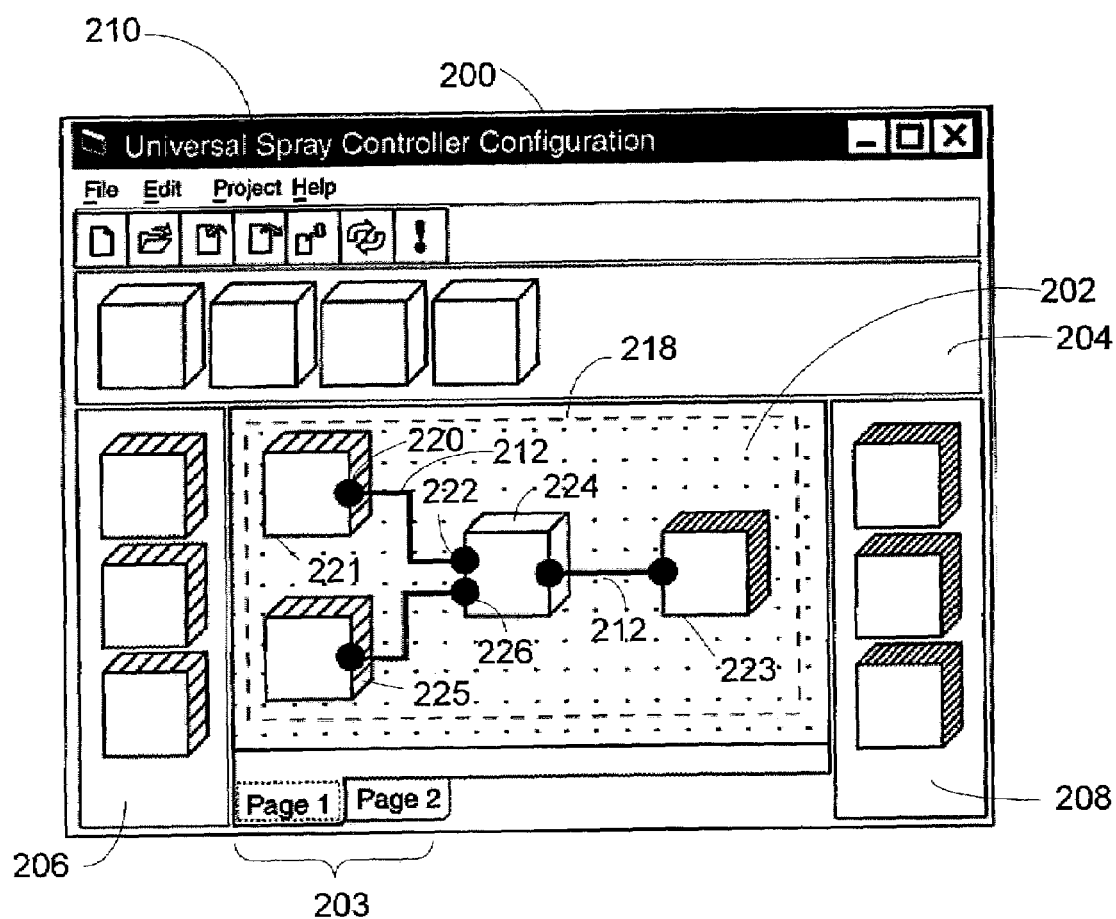
FIG. 4 illustrates a configuration program to be used for creating a functional block representation of the spray controller.

For ensuring the functional interaction of the plurality of objects that comprise the system, the software objects are interconnected using a configuration program 200, as shown in FIG. 4. In one embodiment, the configuration program is an object-oriented application that executes on the computer 30, and has facilities for accessing the plurality of software objects from a function block library residing within the memory of the computer, or other storage medium. The configuration program 200 has a graphical user interface (GUI) that comprises a drawing board 202 which can be spread across multiple pages. The pages are accessed via tabs such as tab 203 shown in FIG. 4. The configuration program also presents toolbars/palettes for selecting the various types of function objects 204, input objects 206, output objects 208, and basic menu items 210 for application control. For added convenience, these various toolbars, palettes and controls may be activated using a mouse device, scroll ball, touch pad or standard function keys provided by the keyboard. Any computer operating system having the appropriate APIs and function calls for processing user input commands (e.g. mouse or keyboard entry) and rendering graphics to a computer display screen is suitable for executing the configuration program.

Software objects are selected and then placed on the drawing board 202 and logically interconnected using connector lines 212 to create a functional block representation 218 of the controller 20. Connector lines 212 are extended between the one or more input/output lines 124/126 of the objects being connected, such as by calling the drawline function within the Microsoft Windows operating system. This results in a graphical line being generated on the display, which can be extended and adjusted across the drawing board accordingly using the mouse, or similar cursor placement mechanism.

The functional block representation 218 is similar to a circuit diagram, where pluralities of integrated circuits are represented as being connected to each other via signal lines. Because the controller system is represented graphically, the user of the configuration program need not have programming experience to implement the functionality of the controller 20. The user merely needs a basic knowledge of the features of the controller hardware, and an understanding of the process to be implemented. Unlike some conventional programming methodologies, such as ladder logic, the intricacies of the operation to be executed need not be explicitly programmed by the user. Rather, the plurality of objects made available to the configuration program from the function block library, contain internal mechanisms for performing these operations. This again decreases the amount of time required to generate an operable spray control program.

In an effort to further increase a user's ability to program the controller, the configuration program 200 also includes various iconographic controls for performing common user tasks. This includes various buttons/controls for opening an existing or saved functional block representation, exporting and importing files between the PC 30 and the controller 20, saving a created representation, and refreshing any file content. Another important feature of the configuration program is the data validation control, which analyzes the data that is provided as input into each object. This feature reduces the time to debug and develop a spray controller program by identifying invalid data, instructions or command inputs instantly. The validation control feature is further explained with reference to FIG. 5.

Figure 5:
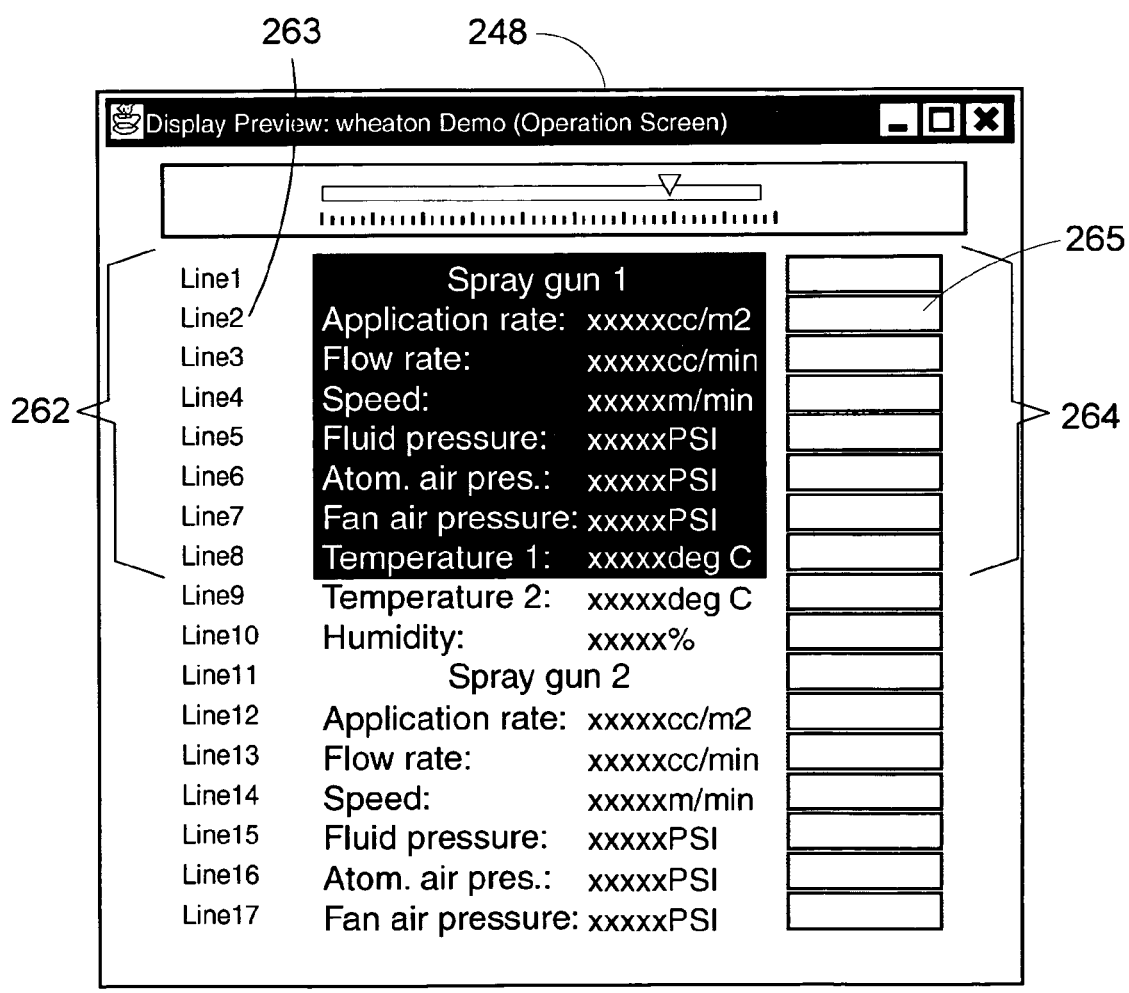
FIG. 5 illustrates a display window initiated by the configuration program of FIG. 4 for receiving data input from a user.

FIG. 5 shows a display window 248 for receiving user input for a spray gun object 172. Each of the lines 262 and data fields 264 shown in the display window 248 corresponds to one or more of the spray gun object input terminals 173 (see FIG. 3(*b*)). For instance, Line2 263 and data entry field 265 correspond to the application rate input terminal 175 of the spray gun object 172. The user enters the data for each input into the corresponding data field(s) 264. By activating the validation control, the configuration program 200 analyzes the data entered, and rejects any invalid input. The configuration program 200 can then assign default values automatically, or optionally, alert the user of the configuration program of the changes that are needed. This feature further guides the user during the design process, and enhances ease of use of the configuration program.

Figure 6A:
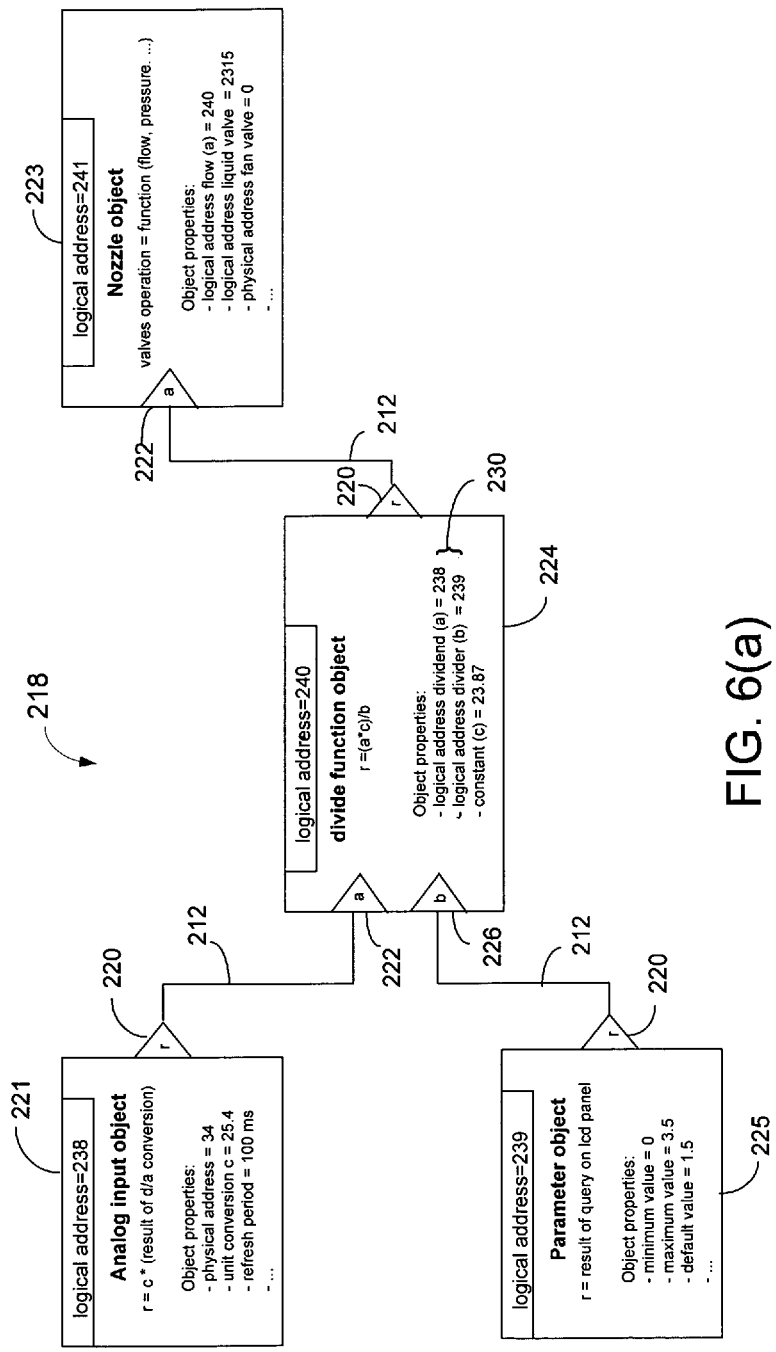
FIG. 6(a) illustrates the functional block representation created using the configuration program of FIG. 4.
Figure 6B:
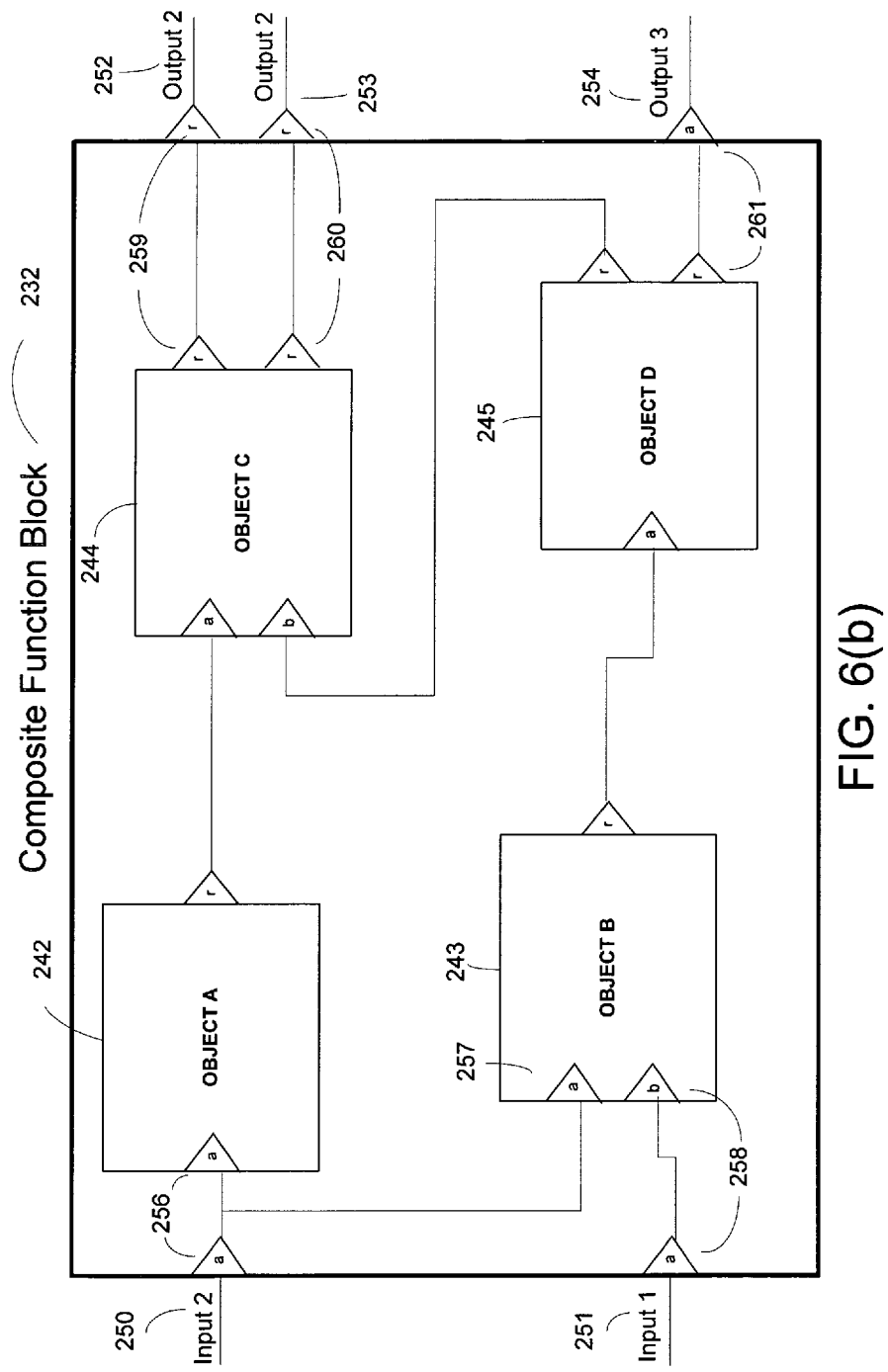
FIG. 6(b) illustrates a composite block function to be used for creating a functional block representation of the spray controller.

With reference now to FIG. 6(*a*), the functional block representation 218 as shown on the drawing board 202 of FIG. 4 is illustrated in greater detail. Each of the software objects are interconnected by extending a connector line 212 from a transmission line 220 (e.g. output) to a receiving line 222 (e.g., input). Lines are the primary connection points of an object for exchanging data and commands between interconnected objects, and are specifically defined according to the object's interface design. As discussed earlier, each object exposes its internal procedures and data to other objects according to a unique interface. An object interface is created using OOP techniques to correspond to the distinct characteristics of the physical or logical component that the object depicts. Thus, the number of input and output terminals of an object will vary depending on the type of physical or logical component being represented. For example, object 224 is a function object for performing division that is comprised of two input terminals 222 and 226. These terminals serve as inputs for receiving a dividend and divider data respectively. However, the analog input object 221, nozzle object 223, and parameter object 225, also shown in the FIG. 6, comprise only single input terminals due to their differing function and interface design For defining the intrinsic properties of an object, internal data 122 is specified during the creation of the functional block representation 218 by the user of the configuration program 200. In other instances, the manufacturer of the spray controller can preset the internal data according to a specific component type or application requirement. This includes data such as the unique name 135 of a given object, the maximum/minimum values of any input or output data, any special control options, and other characteristic data. While general object-oriented methods result in the modification or alteration of data during the execution of an object, the internal data remains static throughout. Also, in addition to internal data, each object is assigned one or more unique logical values for being referenced by other objects, and for controlling the flow of data between interconnected objects. Because each object is assigned a unique logical value, data and commands can be easily transferred and received by each object.

Logical addresses 238, 239, 240 and 241 are assigned to objects 221, 225, 224 and 223 respectively. Preferably, the logical values of an object are assigned automatically by the configuration program 200, and are hidden from the user during the creation of the functional block representation 218. By way of example, the division object 224, specifies logical address 238 for its dividend input 'a', and address 239 for its divider input 'b' (see 230). As such, the result 'r' 220 of the analog input object 221 having logical address 238, and the result 'r' 220 of the parameter object 225 having logical address 239 is provided as input. Likewise, the result 'r' of the division object 224 logically flows into the nozzle object 223 as indicated. The logical flow of data between objects is therefore ensured through the assignment of the logical addresses.

In addition to logical address designations, each of the objects that represent hardware must refer to that hardware component with a physical address. The physical address is made up of a circuit board or bus address value and optionally a port number that the corresponding component is physically connected to. Hardware configurations suitable for connecting the external components of the controller 20 together according to a physical addressing scheme can include, but are not limited to, a CAN (controller area network) interface connector, a signal block device having multiple I/O terminals, a port connector, or any standard bus interface device. By referring to a physical address, each software object representative of hardware can be mapped to its corresponding physical component to allow for its control and manipulation. Preferably, the user specifies the physical addresses during the creation of the function block representation 218 by selecting them from an address list provided by the configuration program 200. Alternatively, the addresses can be assigned automatically by the configuration program.

For providing convenient programming of the spray controller, a spray controller configuration wizard may optionally be utilized in conjunction with the configuration program 200. Commonly used in software applications that employ a GUI, a wizard is a utility associated with an application that helps a user of the application perform a specific task with greater ease. For example, a "letter wizard" within a word processing application leads a user through the steps of producing various types of written correspondence. The user need only provide the basic input parameters and/or input data required to yield the end result (the letter), such as the primary mailing address or recipient information. The wizard typically facilitates the data collection process by prompting the user to enter the data in response to a series of questions. Based on the information provided, and the requirements of the user, the wizard generates the desired user output.

This same approach may also be applied to the design of a functional block representation 218, wherein a wizard guides the user through the spray controller 20 configuration process. The wizard obtains basic input information from the user, such as the desired application rate of the controller, pressure and flow rates, etc. The wizard preferably permits user access to a database of nozzle or spray gun characteristics to increase the user's ease of programming. Such characteristics would include application flow/pressure, fluid drop sizes and spray application patterns, pressure/atomizing air pressure, and other basic characteristics, and are commonly available as would be understood by those skilled in the art. The user would simply need to select from the list of available characteristics based on their particular application. This selection process is facilitated using a graphical window, such as a dialog box, having a pull-down menu feature for selecting a desired characteristic. Based on the user selections, the wizard extrapolates the information accordingly and assemble the corresponding functional block representations to achieve the desired result. Such a utility would significantly minimize the time required to design and program complex spray controller systems having multiple control characteristics.

As yet another feature of the invention, the configuration program 200 provides access to composite function blocks to further speed the control program development process. Composite function blocks are groups of individual function blocks that are interconnected and grouped to represent a single function block. These blocks can either be created by the user, or provided by the function block library by the manufacturer of the spray controller. When the user creates the composite function block, the user has the ability to manipulate the internal connections, data and other pertinent information within the composite function block. In this way, they may develop customized blocks to meet specific control requirements. These blocks can then be assigned a unique function block name, and saved in memory for later usage.

A generalized example of composite function block 232 is shown in FIG. 6(*b*). In this example, objects A 242, B 243, C 244 and D 245 are interconnected via their respective input and output lines to provide some logical or physical operation. The composite function block is comprised of INPUTS 1 and 2, 250 and 251 respectively, as well as OUTPUTS 1–3, 252–254. As such, the inputs to the various objects that comprise the composite function block 232, namely 256–4258, act as inputs for the composite function block as well. The outputs 259–261 also define the outputs of the composite function block. Thus, when selecting the composite function block for use in the design of a functional block representation 218, the user need only provide the necessary input and output data to the composite block interface. As discussed previously, the internal complexities of the program (e.g., interconnections of objects A–D) are hidden from the user, making it easier to design a control program. Composite functions blocks enable a modular approach to programming the controller, which significantly advances the ability to design a complete representation of the system.

The function block library, which contains all of the various components of the controller system, can be used in connection with any spray controller system. Regardless of the particular hardware arrangement of the controller, it can be readily programmed using the configuration program 200 described above as long as a function block library containing the appropriate component implementations/representations and data for the controller is provided. Thus, the configuration program is not limited to any specific spray controller implementation. Rather, the manufacturer of the spray controller can provide the appropriate software objects—implemented as data structures—that correspond to their particular system.

Figure 7:
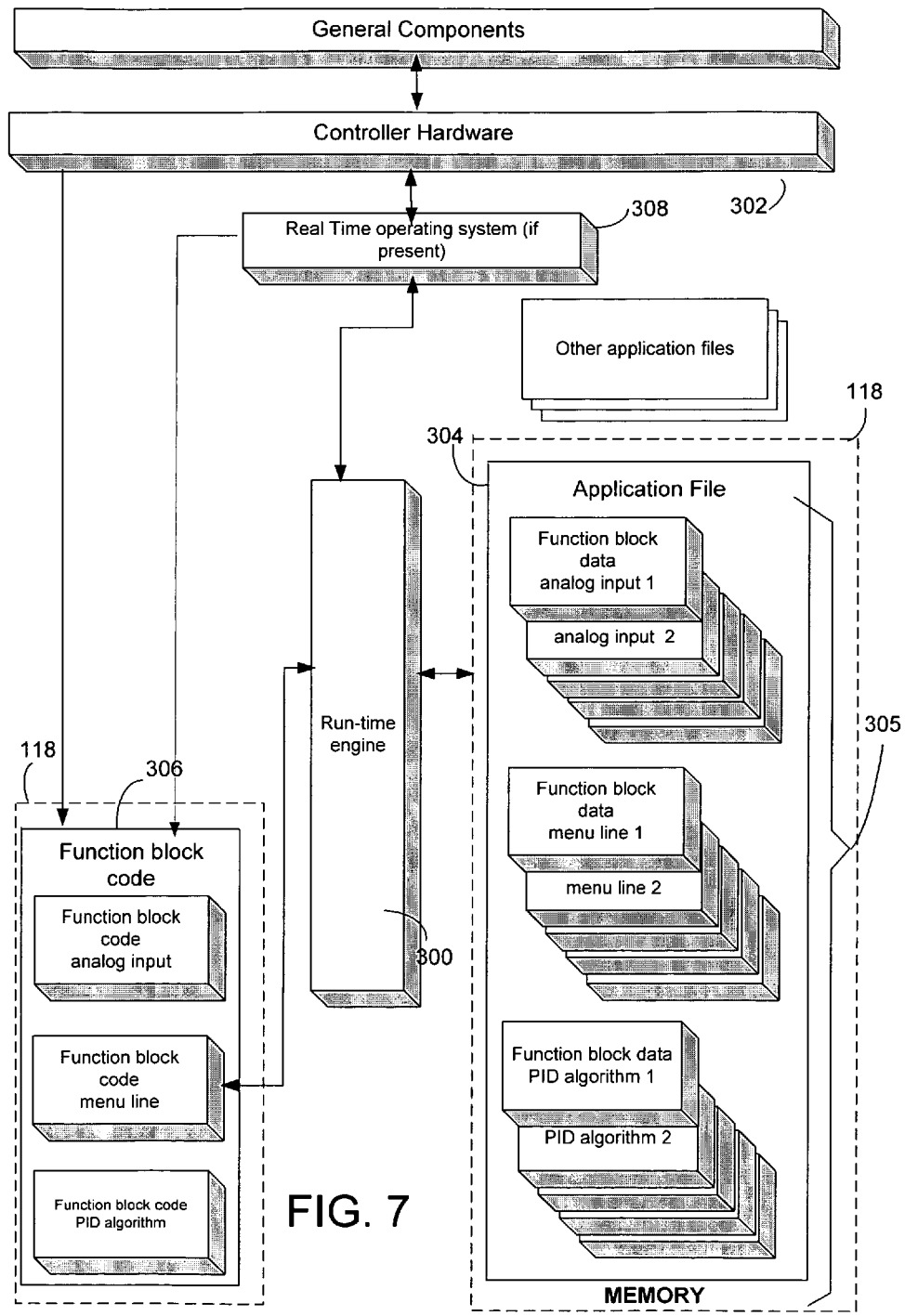
FIG. 7 illustrates the software architecture of the spray controller shown in FIG. 1.

The operation of the controller 20 is shown in FIG. 7. More specifically, the method of the invention by which the functional block representation 218 is translated into actual instructions for implementing the functionality of the spray controller 20 will be described.

Once a complete functional block representation 218 is formed, an application file 304 is created, as shown in FIG. 7. The application file 304 is a binary version of the functional block representation 218 that is generated by the configuration program 200. As a result, the application file specifies all of the objects 305, characteristic data and logical instructions indicated by the functional block representation 218. The functionality of the controller is therefore defined by the data in the application file 304. After the application file is generated, it can be easily transferred from the PC 30 to the controller 20 over the communication channel 33, and stored into controller memory 118. Alternatively, the application file can be saved to a portable storage medium, such as a diskette 31, and then uploaded into the controller memory 118. Any means by which the file is transferred from the PC 30 to the controller 20 is within the scope of the invention.

According to another aspect of the invention, a run-time engine interprets and processes the data contents (e.g., software objects, internal data, logical instructions) of the application file. The run-time engine 300 is an interrupt-driven operating system that executes within the controller 20. The run-time engine 300 acts as the intermediary mechanism that integrates the data and logical instructions contained in the application file 304 with a set of function block code 306 stored in memory 118. The function block code 306 is a collection of programmed instructions that characterize each of the plurality of data structures/software objects 305. For each of the objects 305 indicated in the application file 304, the runtime engine 300 executes a corresponding set of function block code 306 that performs the specified logical or physical operation of the controller 20. The term "set," as used herein, refers to one or more lines of computer-executable instructions. Each set corresponds to an individual property of the controller. Thus, there are as many sets of function block code as there are logical and physical components that comprise the controller system. This code is created by the controller manufacturer using a high-level programming language such as C, and stored into the controller memory 118. Overall, the function block code provides the fundamental characteristics of the controller, and is designed to control the input and output characteristics of the controller hardware 302 directly, or interact with the OS 308.

Figure 8:
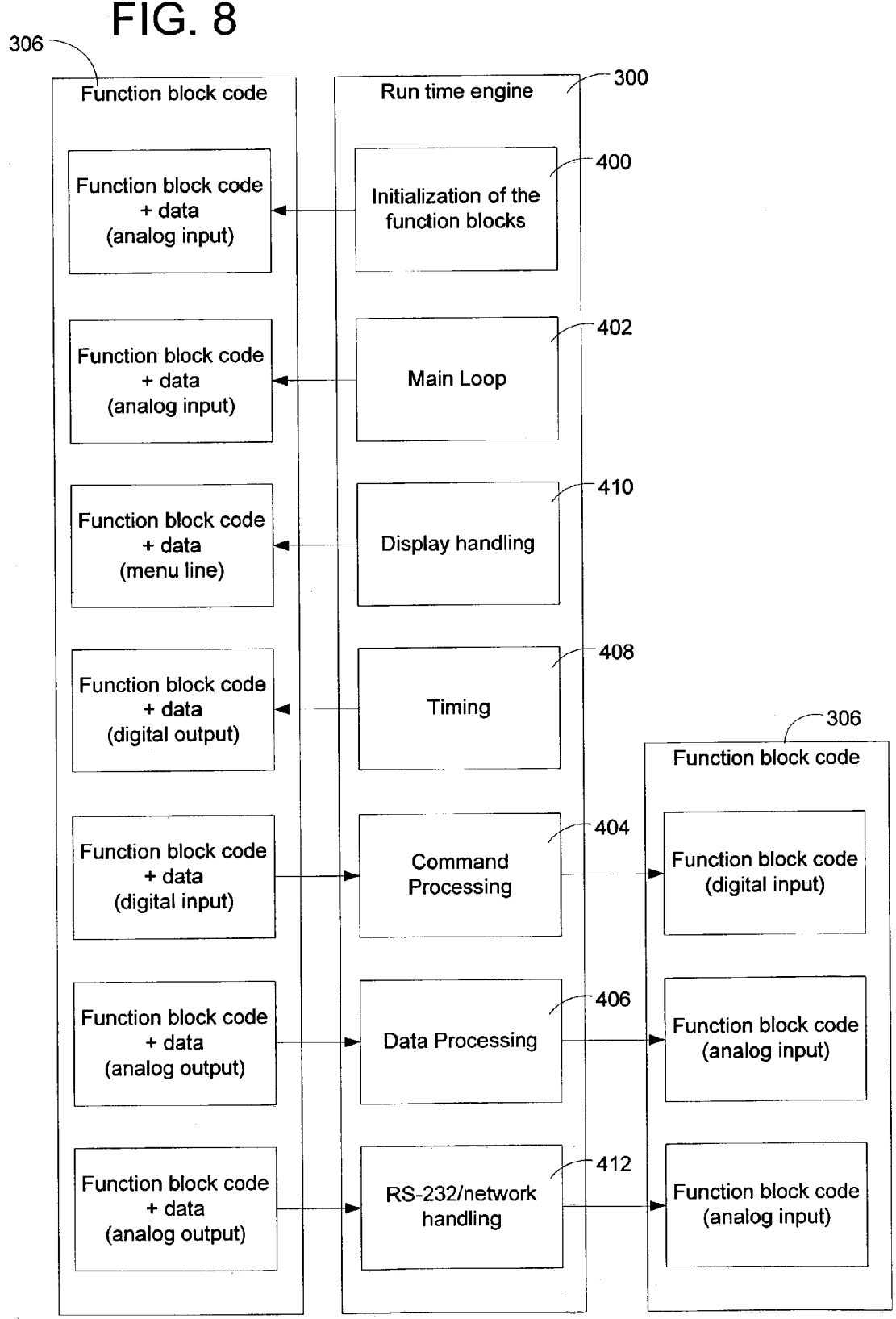
FIG. 8 is a block diagram generally illustrating the primary tasks of a runtime engine according to the present invention.

With reference now to FIG. 8, the primary tasks of the runtime engine are shown. In addition to interpreting the contents of the application file 304, the runtime engine 300 is also responsible for initializing 400 and executing 402 the function block code 306 corresponding to each software object 305. The runtime engine is also responsible for processing the commands 404 and data 406 specified in the application file 304. Moreover, the runtime engine 300 interacts with the other integral mechanisms of the spray controller 20 to provide the various features of the system. One of these mechanisms is the real time operating system (OS) 308 of the controller (if present), shown in FIG. 7. The runtime engine 300 can interact with the OS to schedule and synchronize (time) system events 408, handle information display 410, perform networking capabilities 412, and other general computing tasks.

Those skilled in the art will recognize that the runtime engine 300 can operate within the controller 20 independently of the real time operating system 308. The real time operating system 308 need not be present within the controller to carry out the primary functions of the runtime engine 300 as described above. However, the runtime engine 300 of the present invention is implemented such that the processing, timing, and management activities of the controller can be handled correspondingly in situations where both systems 300/308 are present; eliminating the need for full conversion of existing systems from one primary system to another. In general, a real time operating system 308 relates to a software driven mechanism that performs basic computing tasks, such as recognizing input from a user keypad, sending output to a display screen, keeping track of files and directories on the within memory, and controlling peripheral devices that are coupled to the system. The runtime engine 300 disclosed herein can perform these basic mechanisms. Moreover, the runtime engine 300 is capable of operating in conjunction with the controller CPU to perform its tasks according to relative clock speeds and processing rates.

Figure 10:
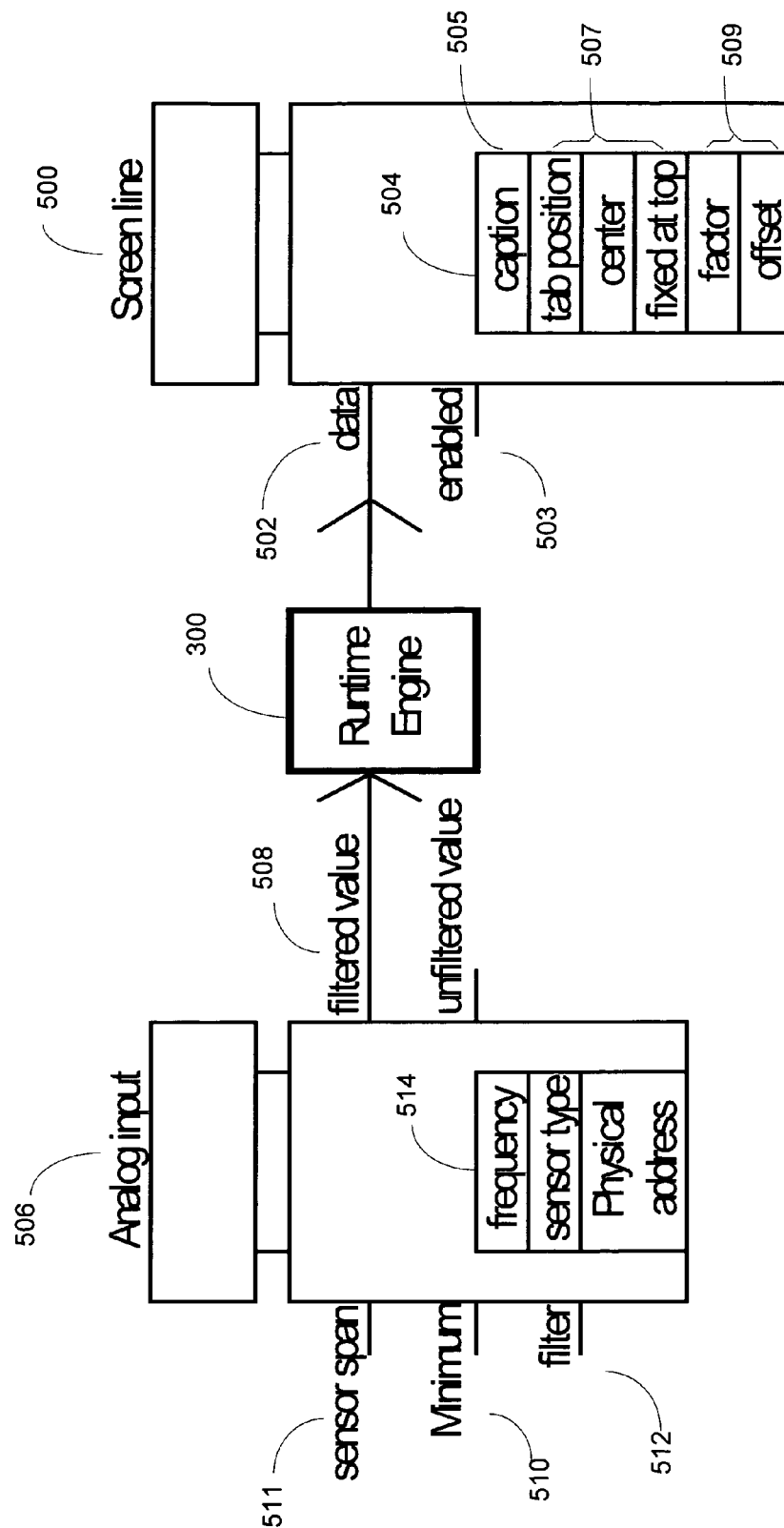
FIG. 10 is illustrative of two interconnected objects exchanging data in accordance with the invention.

Flowcharts 9(*a*) and 9(*b*) illustrate the procedural steps taken by the runtime engine 300 for performing function block code initialization 400 and main loop process execution 402. The initialization procedure 400 is carried out when the user first activates the controller in order to ready the function block code for processing by the runtime engine 300. Once the code is initialized, it is executed as often as possible according to the main loop procedure 402 of the runtime engine 300. Also, flowcharts 9(*c*), 9(*d*) and 9(*e*) show the procedural steps performed by the runtime engine for performing command processing 404, data processing 406 and timing processing 408 respectively. Command processing 404 enables the runtime engine to facilitate the exchange of commands between objects indicated in the application file 304. As discussed previously, objects can send commands to be carried out by other objects by referencing that object. This process allows the objects to interact with one another to trigger external and internal events within the controller. Similarly, the runtime engine is also able to exchange data between objects according to the data processing procedure 406. This process is illustrated by way of example in FIG. 10, which shows two interconnected objects 500 and 506.

As shown, object 500 is representative of a menu line function that is displayed to the LCD display 28 of the controller. It is comprised of an input data line 502, and an enable input 503. Also, the menu line object 500 is comprised of internal data 504, which includes a caption to be written to the display 505, display options and settings 507, and numerical settings 511. The connected object 506 is representative of an analog pressure input component comprising a sensor span input 509, and minimum input value 510, and a filter value 512 for affecting the actual output of the object 506. The analog input object 506 also specifies internal data 514 that defines its intrinsic settings. As illustrated, the input to object 500 is provided by the output 508 of object 506. Thus, during the execution of the controller, the runtime engine 300 requests the output value 508 of the referenced object 506, checks the validity of the data being obtained, converts the data accordingly, and transfers this information to object 500 via the input data line 502. The result, in this example, is the output value of the analog input being printed to the display 28 by the display menu function 502 as the pressure in PSI (the information is output to the corresponding physical address of the controller display).

Figure 9A:
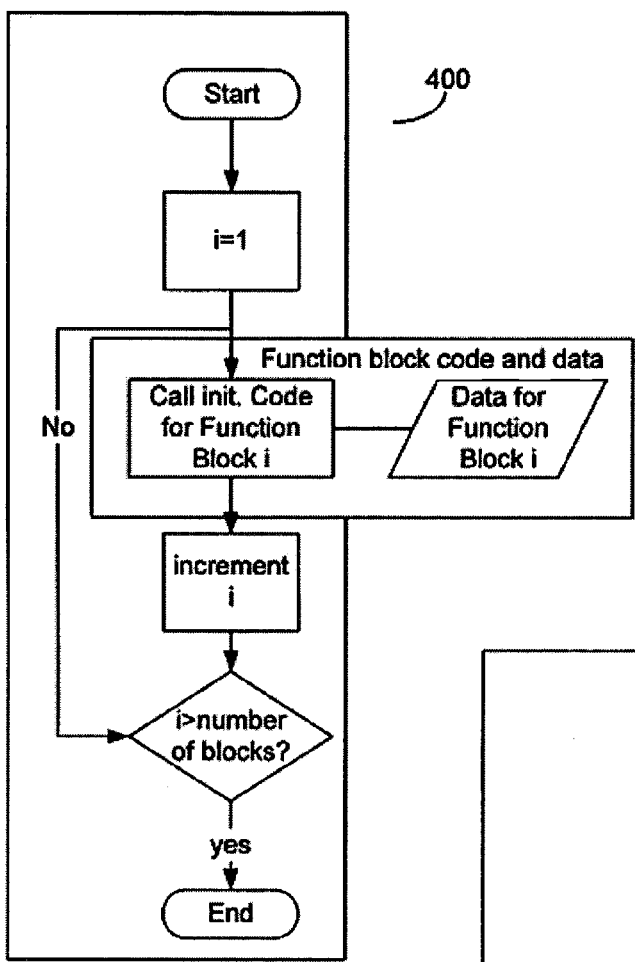
FIGS. 9(a) through 9(e) are flowcharts illustrating the logical sequence implemented by the runtime engine to control the behavior of the spray controller.
Figure 9B:
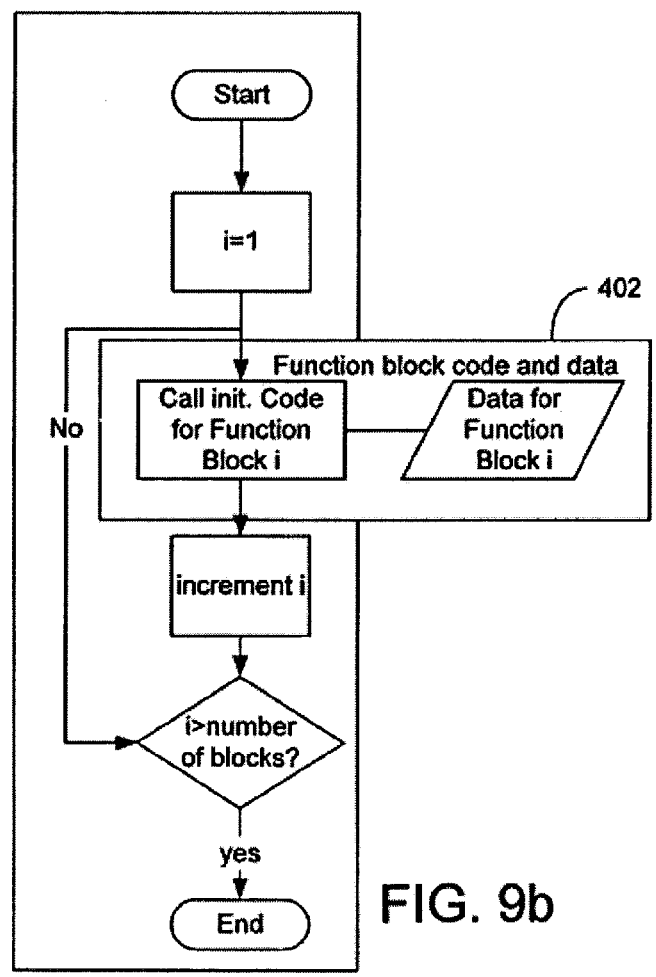
Figure 9C:
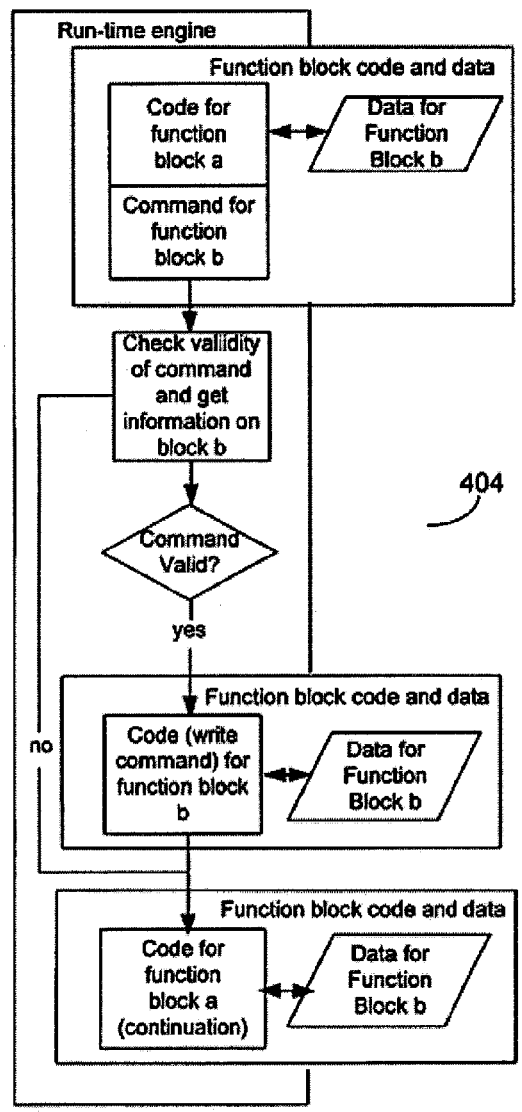
Figure 9D:
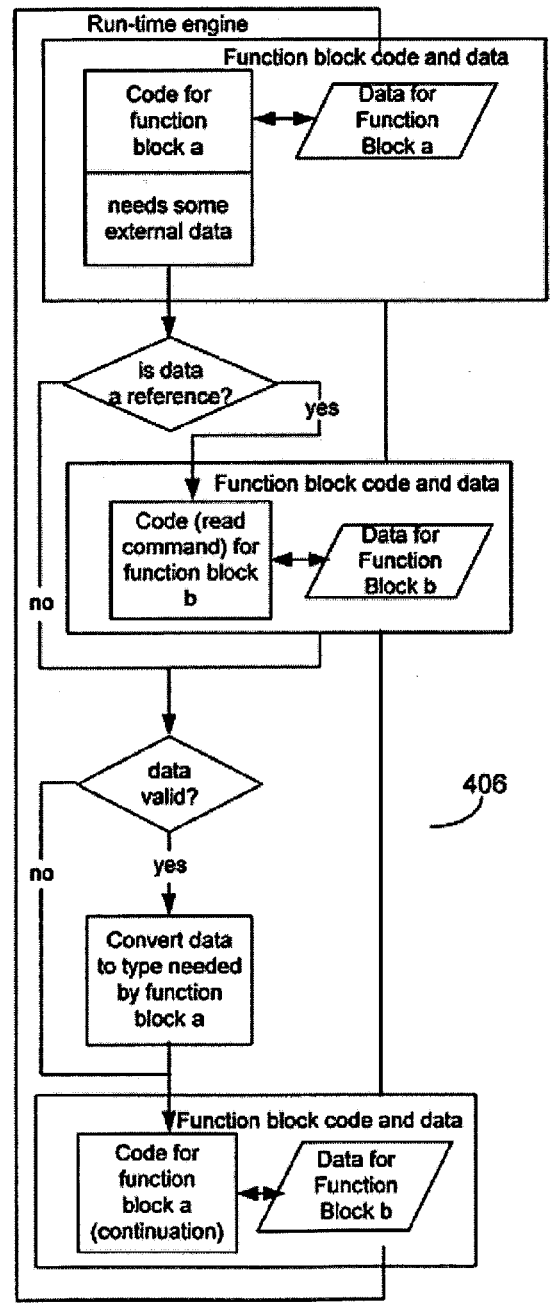
Figure 9E:
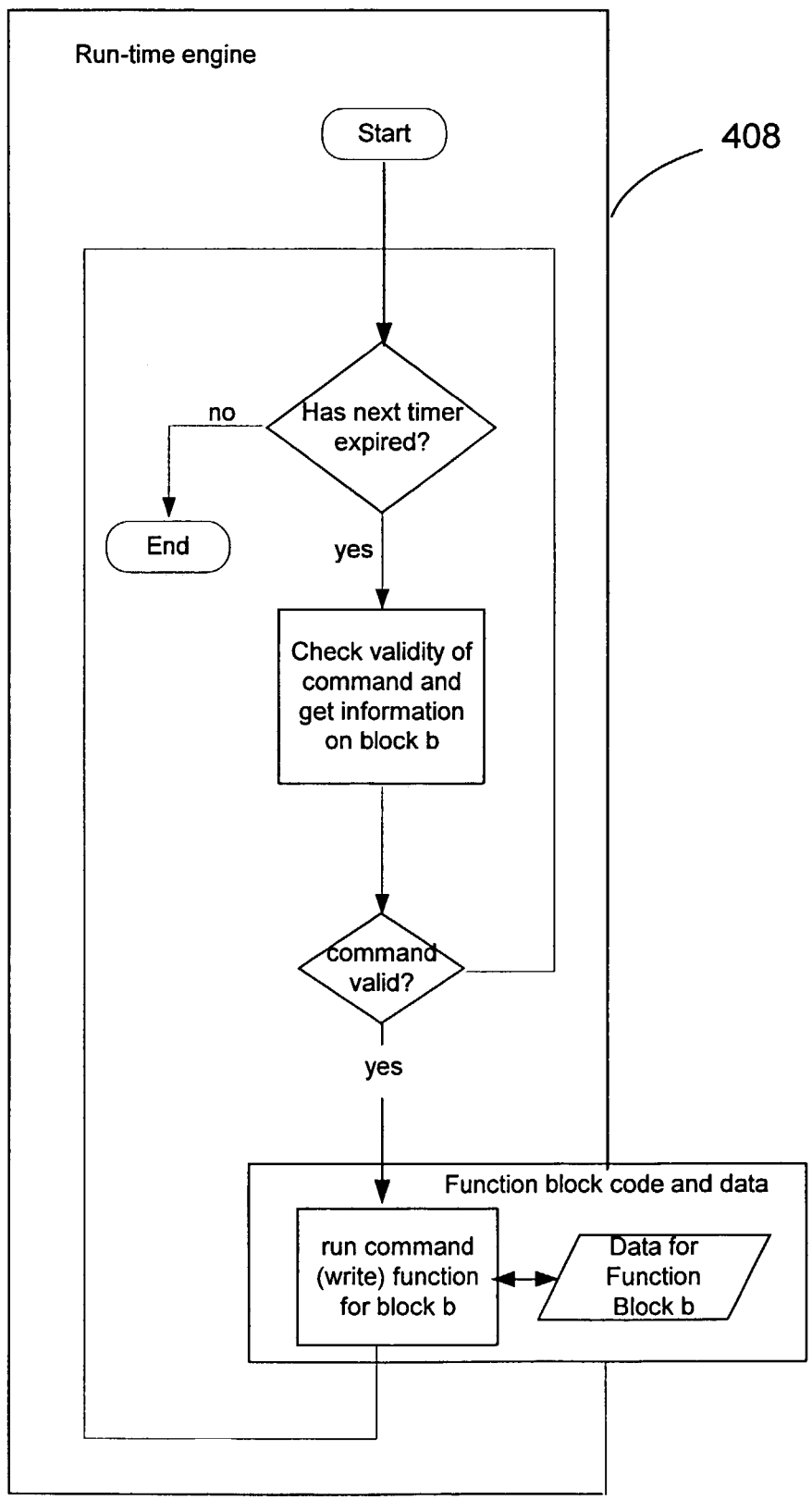

In FIG. 9(e), the procedure carried out by the runtime engine for enabling timing processing 408 is shown. This procedure enables the function block code corresponding to a particular object to be executed at a pre-defined time.

Figure 11:
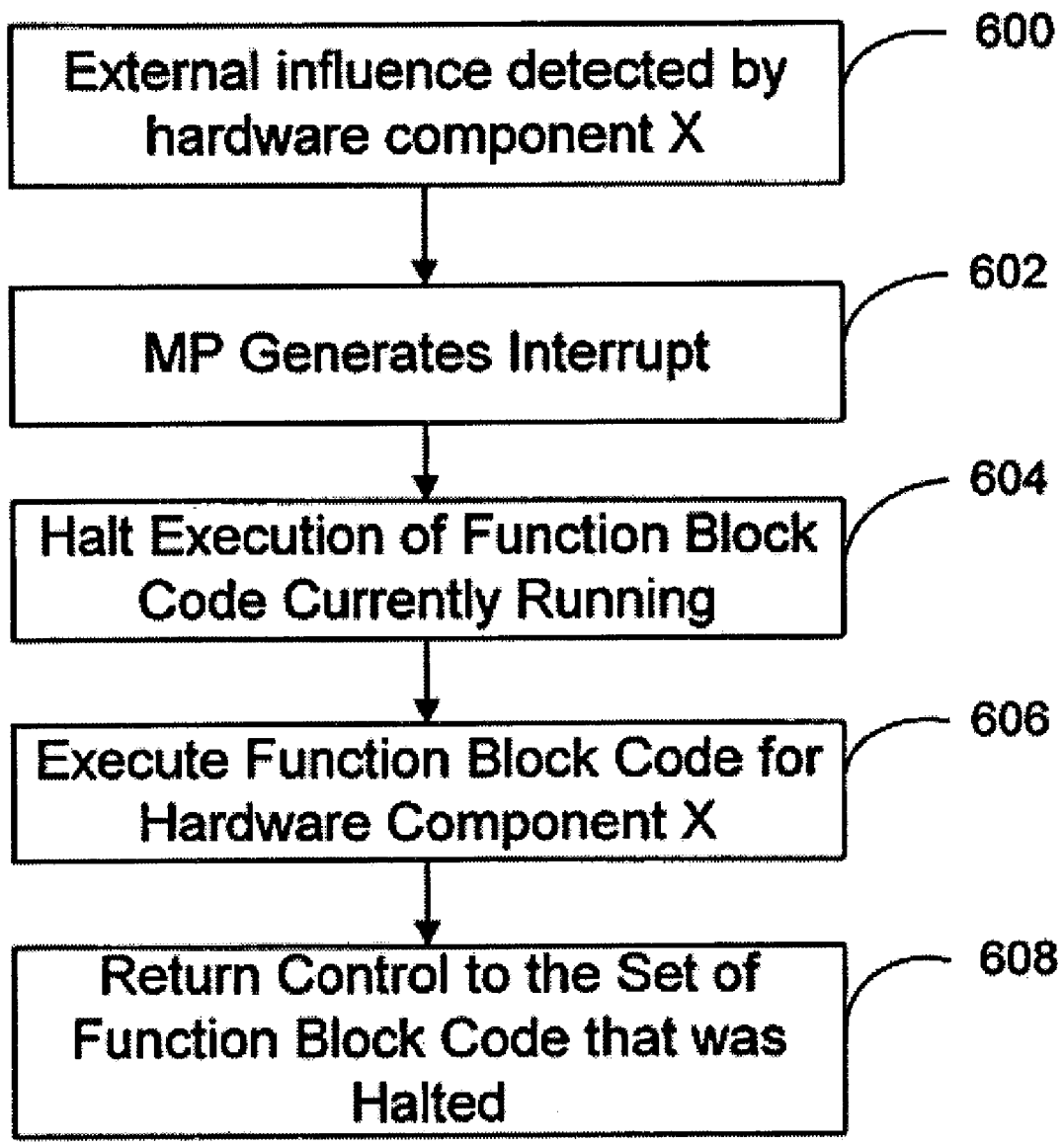
FIG. 11 is a flowchart illustrative of the interrupt processing procedure implemented by the runtime engine.

In accordance with one important feature of the invention, the runtime engine is also capable of handling interrupts generated during runtime execution. Referring to FIG. 11, the various software objects that are indicated in the application file are capable of generating events on their own without being called by the runtime engine (e.g. without invoking the corresponding function block code for that object). This behavior is caused by an interrupt that is generated by the CPU (event 602) as a result of an external influence (event 600) detected by a hardware component of the controller. Such influences can include a specific pressure value detected by a pressure sensor 40, the value of an analog input component 506, or other detector/sensor components. When an interrupt is generated, the function block code being executed by the runtime engine 300 at the time is halted (event 604). Then, the function block code for the hardware component that triggered the interrupt is run instead (event 606). After its code is fully executed, control is returned back to the halted function block code and execution is resumed immediately (event 608). The interrupt handling capability offered by the runtime engine 300 allows the controller to respond rapidly to external events (<1 ms response time). Also, the ability to respond to interrupts provides a unique advantage to spray controllers 20 that employ programmable logic, as this is not present in conventional spraying systems and other PLC devices.

Figure 12:
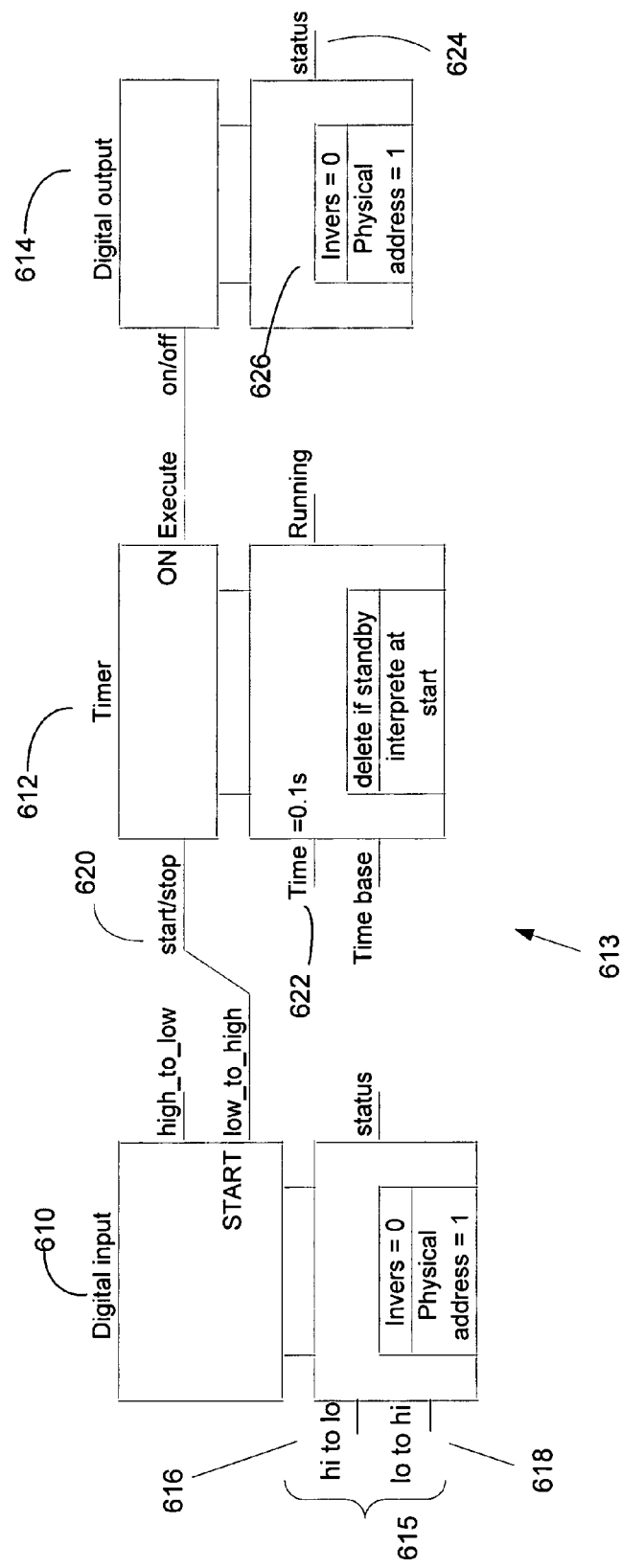
FIG. 12 illustrates the interrupt processing procedure of FIG. 11 with respect to a plurality of interconnected software objects.

In FIG. 12, a functional block representation 613 comprised of three interconnected objects is illustrated to provide an example of the interrupt handling capabilities afforded by the runtime engine 300. The three interconnected objects 610, 612 and 614 represent a digital input, timer function, and digital output respectively. According to the functional block representation 613, the digital input object 610 is capable of receiving commands via its input terminals 615 for triggering high-to-low 616 or low-to-high 618 digital input signals. The commands can be received from an external hardware component such as a sensor 40/42 or a user keypad entry 26. When the input signal is indicated as low-to-high 618, this phenomenon is indicated to the controller 20 microprocessor/CPU and an interrupt is generated. As a result, the runtime engine 300 in conjunction with the CPU stops its currently running function block code and starts the code for the digital input object 610. As those skilled in the art will appreciate, the code for the object responsible for triggering the interrupt—the digital input in this case—need not be in execution by the runtime engine 300 at the time the interrupt is generated. Because of this capability, interrupts can be triggered anytime during the runtime of the controller 20 without impeding its overall performance and operation.

The logical flow of the functional block representation 613 is to the timer function object 612. Once the function block code for the digital input object 610 is started, the runtime engine 300 is invoked to relay a START command 620 to the timer object 612. The timer is a function object that serves as a timed trigger or release for activating other objects or processes within the controller. Upon execution, the timer function adds the value indicated at its time connection input 622 to the current time recorded since the initial interrupt. This value is then saved in the timer's queue of events. In accordance with the sequential interrupt code indicated in FIG. 11, control is then returned to the program that was running before the interrupt was generated.

Once the amount of time stored in the timer queue has elapsed, an interrupt is again generated and the runtime engine 300 executes the timer function block code. The resulting action of the timer in this case is to send an ON command to the digital output object 614. Accordingly, the runtime engine 300 executes the function block code for the digital output timer 614, which places the digital output status terminal 624 in the ON state. The internal data of the digital output object 626 includes the appropriate information for mapping the software object with its corresponding physical component within the controller circuitry. The result of this particular functional block representation 613 when executed by the runtime engine 300 is the activation of the digital output signal 614 of the controller 20.

The example illustrated in FIG. 12 provides only one example of a functional block representation for characterizing the operation of the controller system 20. One of skill in the art will recognize that various implementations of the controller system are possible, and that the overall interaction between objects is established by the user of the configuration program according to the functional block representation 613 and characteristic data provided. Likewise, the interrupt scheme described above provides only a single example of how interrupts can be generated in response to external events, and then handled by the runtime engine 300. The interrupt properties of the controller are ultimately dependent upon the characteristics of the microprocessor(s)/CPU associated with the controller, and is not limited to the above-described implementation.

Overall, the invention provides a convenient way for a user to modify or completely redesign the functionality of a spray controller to meet specific design requirements. The usage of a GUI based configuration program provides a higher level of user friendliness, and accommodates those users who have no programming expertise. All that is necessary to program the spray controller is a basic knowledge of the features of the controller hardware, and an understanding of the process or system to be implemented. With this knowledge, the user can easily design a functional block representation 218 of the system to meet their specific requirements. Also, the configuration program can provide default input values for the various objects, and can reject invalid inputs that are entered by the user. This guides the user along during the creation of the functional block representation 218.

To promote further understanding of the advantages offered by the invention, it is important to clearly distinguish between the function block code 306 and the functional block representation 218. The function block code 306 provides the actual building blocks that define the intrinsic properties of the spray controller. These building blocks are pre-programmed in the controller, and typically cannot be altered by the user. In contrast, the functional block representation 218 is a user-defined template that influences how each of the building blocks interact with each other, and the type of data that they require. Without the functional block diagram 218, the runtime engine 300 cannot execute the function block code 306 in any meaningful way. Hence, the functional block representation 218 provides the data and logical instructions needed by the function block code 306 to ensure that each logical or physical property of the controller 20 is implemented in a desired way. As those skilled in the art will recognize, this is clearly advantageous over conventional systems where the ability of the user to control, manipulate, or modify the functionality of the controller is limited to only the pre-defined user modes or settings.

Accordingly, an object-oriented environment and system meeting the aforestated objectives has been described. The invention permits a user to readily configure a spray controller without an in-depth knowledge of the programming steps involved. Instead, the user may provide information concerning the process being controlled and the basic features of the hardware being employed. In operation, the application is executed using an interrupt-driven run-time environment to enable the use of lower cost components.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. An interrupt-driven system for controlling a spray system including a plurality of spray nozzles, a fluid supply, and a spray controller having a processing unit and memory, the interrupt-driven system comprising:
   an application file residing in the memory, the application file being a binary version of a functional block representation created using an object-oriented software program, the functional block representation including a plurality of software objects representing the physical and logical properties of the spray system and including at least a regulator object and a spray gun object representing a spray gun in the spray system, the plurality of objects being interconnected to create the functional block representation, the regulator object generating a regulating control signal based on measured pressure data and flow rate data of the spray gun, the spray gun object generating operation control signals for controlling operation of the spray gun in response to the regulating control signal; and
   a runtime engine residing in the memory for processing the application file, said runtime engine enabling communication between the plurality of objects and for processing interrupt signals provided by at least one of the plurality of objects, the interrupt signals being responsive to a stimulus detected by the spray controller.

2. The interrupt-driven system of claim 1 wherein each of the plurality of software objects comprises a data structure having internal data representative of a corresponding concept and an external interface implemented as a method.

3. The interrupt-driven system of claim 1 wherein the object-oriented software program is capable of accessing a function block library for providing the plurality of objects and interconnecting the objects to create the functional block representation.

4. The interrupt-driven system of claim 3 wherein at least certain of the plurality of software objects are capable of generating output data in response to a data input, the data being generated during execution of the runtime engine.

5. The interrupt-driven system of claim 4 wherein one or more of the plurality of software objects are capable of invoking an action in response to a command input.

6. The interrupt-driven system of claim 1 wherein the runtime engine facilitates the exchange of commands between one or more of the plurality of software objects according to a unique reference value assigned to the command, the command and corresponding reference value being specified in the application file.

7. A method for enabling operation of a spray controller for a spray system according to contents of an application file loaded into a storage medium located on the spray controller, the application file comprising one or more data structures and associated parameters that are representative of physical and logical properties of the spray controller, wherein the spray controller is capable of responding to interrupts generated during runtime, the method comprising:
   initializing the one or more data structures specified by the application file for execution by a runtime engine; and
   executing a set of function block code that corresponds to the one or more data structures executed by the runtime engine, wherein the function block code includes instructions for interacting with a physical component of the spray controller in response to processing of the one or more data structures and associated parameters that are representative of the physical and logical properties of that component, and wherein the function block code includes code for a regulator object and code for a spray gun object representing a spray gun, the regulator object generating a regulating control signal based on measured pressure data and flow rate data of the spray gun, the spray gun object generating operation control signals for controlling operation of the spray gun in response to the regulating control signal.

8. The method of claim 7, wherein the step of executing further comprises transferring data from one data structure to another data structure, wherein the data being transferred includes the associated parameters of an object.

9. The method of claim 8, wherein the step of transferring includes specifying a unique logical address of the data structure in which the data is to be transferred from by the data structure requesting the transfer.

10. The method of claim 8 wherein the step of transferring further includes validating a command sent by the one data structure.

11. The method of claim 8 wherein the step of transferring further includes transferring a command from the one data structure to the data structure intended to receive the command in accordance with the unique logical address of the data structure intended to receive the command.

12. The method of claim 8 wherein each data structure specified in the application file has a unique logical address for being referenced by other data structures.

13. A control system for a sprayer of the type comprising a plurality of spray nozzles, a fluid supply system, and a spray controller including a processing unit and memory and being operable to provide output signals for controlling said plurality of spray nozzles, comprising:

means for receiving and storing in the memory spraying system characteristic data;

means for transmitting command signals to said plurality of spray nozzles to thereby control the flow of fluid;

an application file compiled from an object-oriented software program including a plurality of software objects, said objects being accessible from a function block library and representing certain physical and logical properties of the control system, said objects exchanging, with other of said objects, messages indicative of an operation to be carried out or a status of a sending object, said object-oriented software program being compiled into an application file located in the memory of the spray controller, the objects including at least a regulator object and a spray gun object representing a spray gun, the regulator object generating a regulating control signal based on measured pressure data and flow rate data of the spray gun, the spray gun object generating operation control signals for controlling operation of the spray gun in response to the regulating control signal; and a runtime engine residing within the memory of the spray controller for processing the application file, said runtime engine enabling communication between the plurality of objects and for processing interrupt signals provided by at least one of the plurality of objects, the interrupt signals being responsive to a stimulus detected by the spray controller.

\* \* \* \* \*

UNITED STATES PATENT AND TRADEMARK OFFICE
CERTIFICATE OF CORRECTION

| | | |
|---|---|---|
| PATENT NO. | : 7,024,285 B2 | Page 1 of 1 |
| APPLICATION NO. | : 10/463164 | |
| DATED | : April 4, 2006 | |
| INVENTOR(S) | : Hans Saelens | |

It is certified that error appears in the above-identified patent and that said Letters Patent is hereby corrected as shown below:

On the Title page, please add the following information:

Related U.S. Application Data

(63)  Continuation of application No. PCT/US02/14873, filed on May 9, 2002.
(60)  Provisional application No. 60/289,830, filed on May 9, 2001.

In Column 1, below the invention's title, please add the following paragraph:

This application is a continuation of PCT/US02/14873, filed May 9, 2002, which claims the benefit of U.S. provisional application No. 60/289,830, filed May 9, 2001.

Signed and Sealed this

First Day of May, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,024,285 B2 | Page 1 of 1 |
| APPLICATION NO. | : 10/463164 | |
| DATED | : April 4, 2006 | |
| INVENTOR(S) | : Hans Saelens | |

It is certified that error appears in the above-identified patent and that said Letters Patent is hereby corrected as shown below:

On the title page add the following information:

Related U.S. Application Data

(63) Continuation of application No. PCT/US02/14873, filed on May 9, 2002.
(60) Provisional application No. 60/289,830, filed on May 9, 2001.

In Column 1, below the invention's title, please add the following paragraph:

This application is a continuation of PCT/US02/14873, filed May 9, 2002, which claims the benefit of U.S. provisional application No. 60/289,830, filed May 9, 2001.

Signed and Sealed this

Eighth Day of May, 2007

JON W. DUDAS
*Director of the United States Patent and Trademark Office*